United States Patent [19]

Moon

[11] Patent Number: 5,111,349
[45] Date of Patent: May 5, 1992

[54] DIGITAL SERVO SYSTEM FOR MOVING BODY BY A DISTANCE EQUAL TO AN INTEGRAL MULTIPLE OF A PREDETERMINED PITCH

[75] Inventor: Ronald R. Moon, Los Gatos, Calif.

[73] Assignee: Alps Electric (USA), Inc., San Jose, Calif.

[21] Appl. No.: 307,864

[22] Filed: Feb. 7, 1989

[51] Int. Cl.$^5$ .................. G11B 5/55; G11B 21/08
[52] U.S. Cl. .................. 360/78.07; 360/78.06; 369/32; 318/560; 318/600
[58] Field of Search .................. 360/78.06, 78.07; 369/32, 33, 41; 318/561, 560, 569, 570, 571, 594, 600, 636, 276

[56] References Cited

U.S. PATENT DOCUMENTS

| | | |
|---|---|---|
| 3,936,876 | 3/1976 | Taylor . |
| 4,030,136 | 6/1977 | Smith et al. . |
| 4,068,269 | 1/1978 | Commander et al. . |
| 4,072,990 | 2/1978 | Case et al. . |
| 4,103,314 | 7/1978 | Case .................. 360/78.06 |
| 4,115,823 | 9/1978 | Commander et al. . |
| 4,133,011 | 2/1979 | Kurzweil, Jr. . |
| 4,166,970 | 9/1979 | Cardot et al. .................. 360/78.06 |
| 4,412,165 | 10/1983 | Case et al. . |
| 4,516,177 | 5/1985 | Moon et al. . |
| 4,775,903 | 10/1988 | Knowles .................. 360/78.07 |
| 4,924,160 | 5/1990 | Tung .................. 318/561 |

Primary Examiner—Aristotelis M. Psitos
Assistant Examiner—Steven R. Garland
Attorney, Agent, or Firm—Guy W. Shoup; Norman R. Klivans

[57] ABSTRACT

A digital servo system for moving a body, such as the magnetic head of a disk drive, by a distance equal to an integral multiple of a predetermined pitch includes a velocity control unit for causing the body to move at maximum acceleration to a predetermined maximum velocity during a first acceleration mode, to move at the maximum velocity during an optional first coast mode, to decelerate from the maximum velocity to an optional intermediate velocity during a first deceleration mode, to move at the intermediate velocity during an optional second coast mode, and to declerate at the maximum acceleration/deceleration rate to zero velocity during a second deceleration mode. The maximum acceleration/deceleration rate is set equal to a rational multiple of the pitch divided by the square of the sampling time of the digital servo system. Respective first through fifth durations of the acceleration mode, first optional coast mode, first deceleration mode, second optional coast mode, and second deceleration mode are suitably set so that the body travels by a distance equal to an integral multiple of the pitch.

8 Claims, 16 Drawing Sheets

Microfiche Appendix Included
(50 Microfiche, 1 Pages)

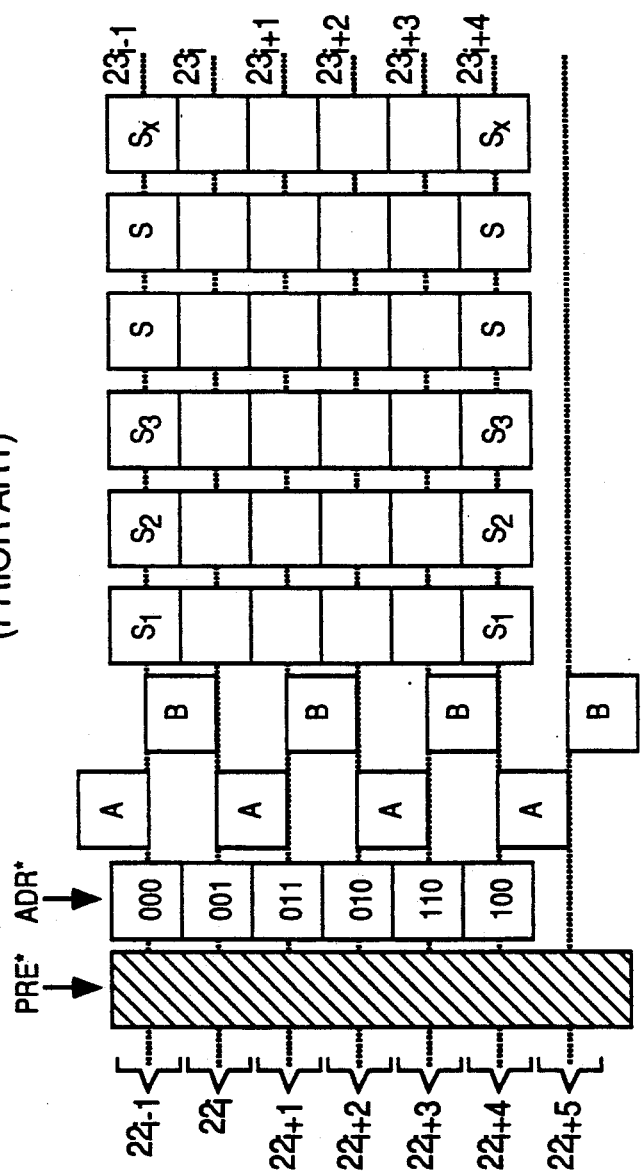

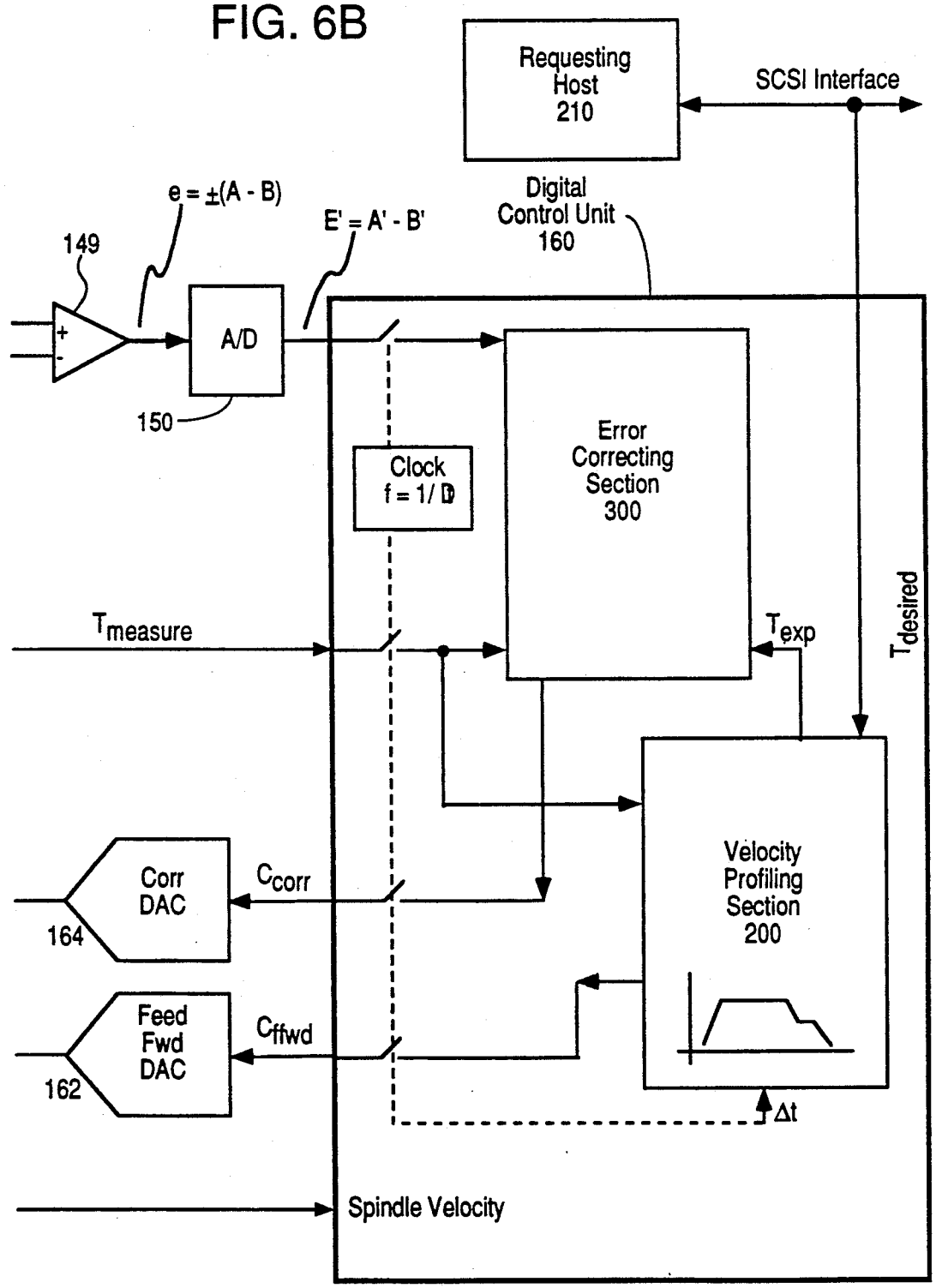

DIGITAL SERVO SYSTEM FOR MOVING BODY BY A DISTANCE EQUAL TO AN INTEGRAL MULTIPLE OF A PREDETERMINED PITCH

CROSS REFERENCE TO OTHER APPLICATIONS AND TO MICROFICHE APPENDIX

This application includes a computer program listing in the form of Microfiche Appendix A which is being filed concurrently herewith as 50 frames incorporated in one sheet of microfiche in accordance with 37 C.F.R. § 1.96. The disclosed computer program (including source and object code) is subject to copyright protection. The copyright owner has no objection to the facsimile reproduction by anyone of the patent document (or the patent disclosure as it appears in the files or records of the U.S. Patent and Trademark Office) but otherwise reserves all other rights to the disclosed computer program including the right to reproduce said computer program in machine-executable form.

This application incorporates by reference the disclosure of co-pending U.S. patent application Ser. No. 07/276,272 of M. G. Machado, R. R. Moon, R. K. Oswald and A. Perahia, which is entitled "Track Address Detecting Means by HDD Sector Servo Method" and was filed Nov. 23, 1988. That application is assigned to the assignee of the present application.

BACKGROUND OF THE INVENTION

1. Field of the Invention

The present invention relates to digital servo systems and more specifically to track seeking and centering servo systems of the type used in disk drives.

2. Description of the Prior Art

It is well known in the field of disk drive design that seek time, which is the time it takes to move a transducer in a disk drive (or in other moving media types of storage devices) from one track to another, may be minimized by using a so-called "bang-bang" technique. The transducer is sped at maximum acceleration from an initial track toward a desired track for half the seek time and is slowed at maximum deceleration for the other half of the seek time. This maximum-acceleration/maximum-deceleration strategy enables the transducer to reach a desired track in the least time possible. But such high speed positioning of the transducer tends to be relatively coarse (imprecise). Accordingly, when the transducer approaches the desired track, it is common practice to activate a track-centering servo system which brings the transducer into finer alignment with the center of the desired track and which holds the transducer at track center.

In one method for aligning the transducer with track center, a first burst of periodic servo data (referred to as the "A burst") is recorded (embedded) exclusively on one side of track center and a second burst of periodic servo data (which is spaced apart from the first burst and is referred to as the "B burst") is recorded (embedded) exclusively on the other side of track center. As the disk spins, the track-centering servo receives disk signals from the transducer, extracts portions of the received disk signals corresponding to the prerecorded A and B bursts, generates an error signal whose magnitude is a function of the difference in amplitude between the transducer-detected A and B burst signals, and attempts to move the transducer in a fashion that forces the magnitude of the error signal to converge to a minimum.

If the transducer detects A and B burst signals of equal amplitudes, the track-centering servo system can assume that equally wide parts of the transducer overlap equally wide regions of the recorded A and B bursts, and as a consequence, that the transducer is precisely aligned with track center. When the amplitudes of each of the detected A and B bursts are nonzero, and the amplitude of one of the detected A and B burst signals is found to be larger than that of the other, the track-centering servo system can decide that the transducer is off track-center and can generate a position correction signal which is proportional to the error signal for moving the transducer into alignment with track center. This correction signal is supplied to a transducer moving means to move the transducer in a manner which ultimately causes the error signal to converge to a minimum.

A problem develops when the A and B burst signal amplitudes are unequal, but one of them is zero. This condition creates a break (nonlinearity) in the relationship between the error signal and the physical misalignment distance (position error). It is desirable to continuously maintain a relatively proportional or linear relationship between the magnitude of the error signal (the difference in amplitude between the detected A and B bursts) and the transducer-to-track-center position error so that the track-centering servo can bring the transducer into alignment with track center in minimal time. The continuity of this relation can be undesirably broken within the track seek/alignment process if, at the end of the maximum deceleration phase of a track seek operation, the transducer comes to rest in a first region which is located approximately midway between two tracks (this first region may be described as a "nonlinear zone") rather than in a second region which is located at the center of a single track (this second region may be referred to as a "linear zone").

In such a situation, the detecting portion of the transducer; which is usually narrower than the physical width of either of the recorded A and B servo bursts, can come to be positioned entirely within the recording width of only one of the A and B bursts (outside the linear zone) rather than being positioned (inside the linear zone) so as to overlay portions of both. The magnitude of one of the detected A and B burst signals is a constant zero under such a condition and the difference between the amplitudes of the A and B burst signals cannot be used to produce an error signal that is linearly related to the actual distance (position error) between transducer position and track center. The condition introduces an undesirable nonlinearity into the transfer function of the track centering servo loop. This nonlinearity makes it difficult to minimize track centering time and the overall track seeking/centering speed of the disk drive is disadvantageously slowed as a consequence.

U.S. Pat. No. 4,669,004, entitled "High Capacity Disk File With Embedded Sector Servo" and issued May 26, 1987 to Moon et al., discloses one solution to this problem. Instead of using just the A and B bursts for each track, a quadrature approach is taken wherein four servo bursts, namely, A, B, C and D are recorded for each track. The advantages of the quadrature approach are discussed in U.S. Pat. No. 4,669,004, whose disclosure is incorporated herein by reference, and they do not have to be repeated here.

While the approach of U.S. Pat. No. 4,669,004 solves the problem of generating nonlinearities in the operating characteristics of a track centering servo, the approach has several disadvantages. Generation of the C and D servo bursts complicates the disk formatting process. The C and D servo bursts disadvantageously increase servo-data length and thus consume media space which could otherwise be used for storing non-servo data (user data). And the complex design of the quadrature based servo system tends to disadvantageously increase the cost of the disk drive. A need exists for a simpler solution.

SUMMARY OF THE INVENTION

It is an object of the present invention to provide an improved track seeking and track centering servo mechanism.

In one embodiment of the present invention, the track seeking operation is divided into a plurality of transducer locomotion modes, including an acceleration mode, an optional first coast mode, a first deceleration mode, an optional second costs mode, and a second deceleration mode. The level of acceleration and deceleration, and the timings of the transducer locomotion modes are selected such that distance traveled by the transducer is approximately equal to an integral multiple of track pitch.

If the transducer is aligned with the center of a first track prior to initiation of the track seeking operation, the transducer should come to rest in a region near the center of the desired track (in the linear zone) after it is moved by an integral number of track pitches. Problems associated with the transducer coming to rest approximately midway between two tracks (outside the linear zone) are obviated.

BRIEF DESCRIPTION OF THE DRAWINGS

FIG. 2B illustrates a refinement of FIG. 2A.

FIG. 5A' is a plot of velocity versus time.

FIGS. 6A, 6B are a block diagram of a servo mechanism in accordance with the present invention.

DETAILED DESCRIPTION OF THE INVENTION

The following is a detailed description of the best modes presently contemplated for practicing the invention. It is to be understood that this description is provided for the purpose of conveying the spirit and illustrating the principles of the invention. It is not intended to limit the scope of the invention. It is further to be understood that, although the invention is described in the context of a track seeking operation, its principles are applicable to other situations wherein it is advantageous to use a digital servo system for moving a body by an integral multiple of a predetermined pitch.

Figure 1:
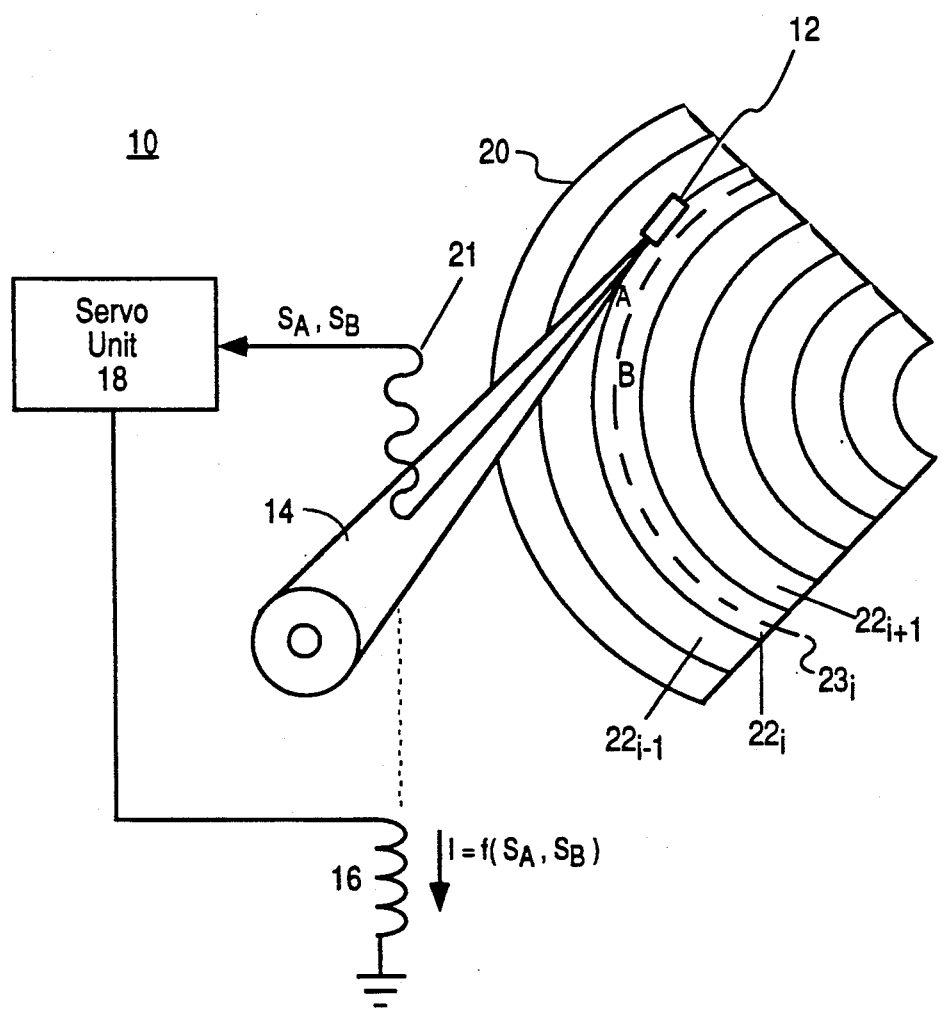
FIG. 1 is a diagram showing the basic structure of a disk drive.

Referring to FIG. 1, there is shown a simple block diagram of a disk drive 10. The disk drive 10 comprises a rotating data storage disk 20 above which there is suspended a radially-movable transducer 12. The transducer 12 is mounted at the head portion of a pivotal transducer arm 14. A magnetic voice coil 16 is mechanically coupled to the arm 14 to move the head portion and the transducer 12 supported thereon, across concentric tracks 22 of the disk 20 and to align the transducer with the center line $23_i$ of a desired track $22_i$. A flexible cable 21 connects the transducer to a servo unit 18 of the disk drive 10. The servo unit 18 receives A and B servo signals ($S_A$ and $S_B$) from the transducer 12 and supplies a correction current $I_c = f(S_A, S_B)$ to the voice coil 16. The magnitude of the correction current $I_c$ is a function of the amplitudes of the detected A and B servo signals, $S_A$ and $S_B$.

The disk 20 may be, by way of example, a high density, rigid magnetic disk (a so-called "hard disk") having a thousand, or more, data storing tracks 22 provided thereon for storing computer data. Movement of the transducer 12 from an initial track $22_i$ to a desired track $22_{i+m}$ may require crossing over hundreds of intermediate tracks $22_{i+1}, 22_{i+2}, \ldots$, before the desired destination $22_{i+m}$ is reached. When the desired seek distance, m, is relatively large, the time needed for moving the transducer (head) over that seek distance, m, can constitute a major portion of the data access time of the disk drive 10. It is desirable to minimize this time. As such, it is desirable to provide a track seeking and track centering servo system which can bring a transducer to the center of a desired track in minimum time for all values of seek distances, m.

While the discussion here refers to magnetic disks, it should be appreciated that other track based methods for storing data, including optical storage methods (such as those used in so-called "compact disk" (CD) optical systems) and the like will also fall within the scope of this invention.

Figure 2A:
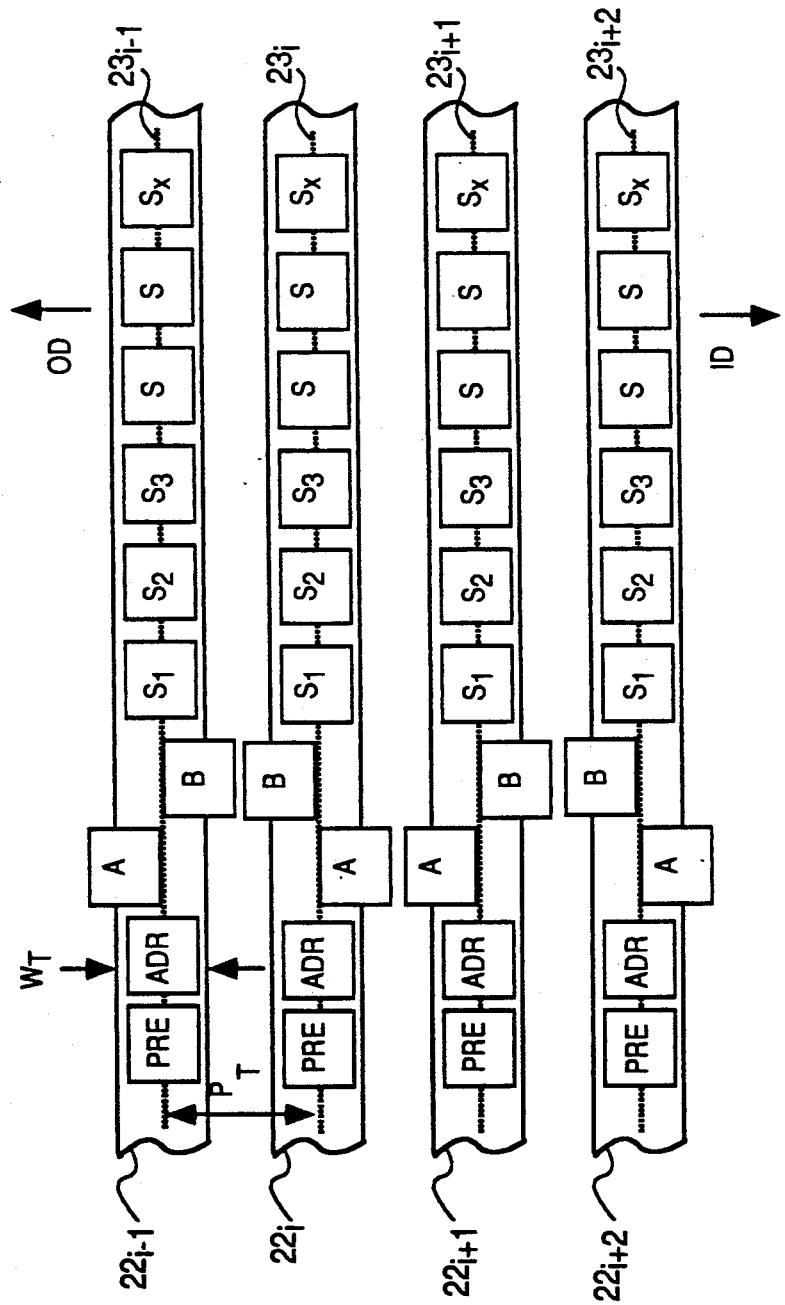
FIG. 2A illustrates a portion of a data storage disk having track centering servo bursts embedded between multiple tracks thereof.

Referring to FIG. 2A, the tracks 22 (individually numbered as $\ldots, 22_{i-1}, 22_i, 22_{i+1}, \ldots$) of the disk 20 are centered about the rotational axis of the disk 20 and are repeated radially at a predetermined track pitch $P_T$. Preamble data blocks PRE and track address blocks ADR are recorded along each track $\ldots, 22_{i-1}, 22_i, 22_{i+1}, \ldots$, to respectively indicate the beginning of a track and to provide the track with a unique identification number, i. The track preamble blocks (PRE), address blocks (ADR), and other track/sector accessing information (not shown) are preferably configured to occupy as little of each track as possible so that major portions of each track can be used for storing computer data (user data) in the form of sector blocks, $S_1$, $S_2$, $S_3$, ..., $S_x$.

Track centering servo bursts, A and B, are recorded in half pitch misalignment with the tracks 22 so as to be alternatively abutted against and define either a bottom side (ID side) of a track center line 23 or a top side (OD side) of the track center line 23 (individually denoted as $23_{i-1}$, $23_i$, $23_{i+1}$, etc.).

FIG. 2A shows separate A and B servo bursts for each track ..., $22_{i-1}$, $22_i$, $22_{i+1}$, ..., so that track pitch $P_T$ can be distinguished from track width $W_T$ and so that the relationship between the A/B servo bursts and odd/even numbered tracks can be easily seen. It should be noted that sequentially adjacent tracks 22 have their corresponding A burst alternately recorded on either the outside diameter (OD) side of the track center line 23 or on the inside diameter (ID) side of track center. The B burst is likewise alternately disposed at the ID and OD sides of track center depending on whether a track is evenly or oddly numbered. This allows the sign of the difference term, A-B, to be used, in combination with data (derived from the ADR blocks) indicating whether at subject track has an odd or even track number, to determine the direction of a correction signal $I_c$; as will be later seen.

Those skilled in the art will appreciate that the B burst of track $22_{i-1}$ may be overlapped and combined with the B burst of track $22_i$, the A burst of track $22_i$ with the A burst of track $22_{i+1}$, and so forth, to thereby minimize track pitch $P_T$. This overlap method is often used in high density magnetic disks and track pitch is usually set equal to track width, $P_T=W_T$.

FIG. 2B shows such an overlapped arrangement. The preamble blocks PRE of individual tracks $22_{i-1}$, $22_i$, $22_{i+1}$, ..., are merged to define a continuous (phase-coherent) preamble region PRE* having a fixed bit pattern which extends radially from the ID of the disk to the OD. The address blocks ADR* of this merged arrangement are partially merged so that no gap exists between them. The merged address blocks ADR* are coded such that their bit patterns sequentially follow a Gray code, thereby creating a condition where adjacent address blocks, i.e., $ADR_{001}$, $ADR_{011}$, $ADR_{010}$, are different at only one bit position. If a transducer simultaneously overlaps two adjacent ADR blocks, there is only one bit whose state may be indeterminable and the worst case error for determining the number of the track over which the transducer is most closely positioned therefore equals one.

Figure 2C:
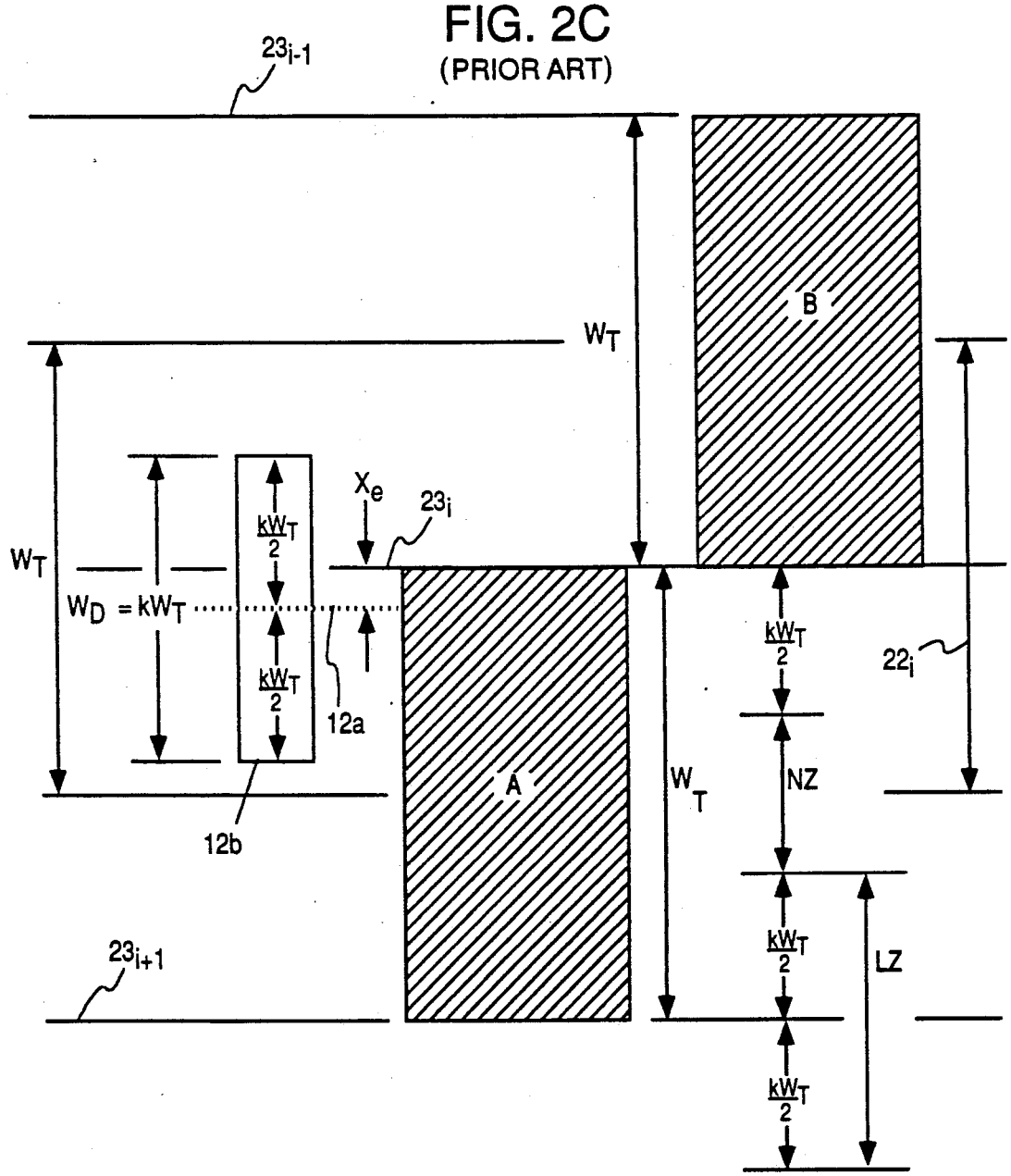
FIG. 2C is an enlarged view of two track-embedded servo bursts and their relation to an off-center transducer.

FIG. 2C is an enlarged view showing the relation between the dimensions of two servo bursts A,B and a signal detecting portion 12b (i.e., read gap) of the transducer 12. If the effective center line 12a of the transducer 12 is aligned with the track center $23_i$ of track $22_i$ then equal amplitudes, $S_A$ and $S_B$, of the A and B servo bursts should be detected by the transducer. The detecting portion 12b (i.e., the read gap of a magnetic transducer) usually has an effective width $W_D$ equal to a fractional portion, $kW_T$, of the track width $W_T$ (that is, $W_D=kW_T$). The factor k can be any number between zero and unity ($0<k<1$). In rigid disk drives the factor k is usually equal to approximately ⅔, and so for the sake of simplicity, k will be assumed to be equal to two-thirds in the following discussion.

As long as position error, $X_e$, between the transducer center line 12a and the track center $23_i$ is less than two-sixths of a track width, $X_e<kW_T/2$, the signal difference, $e=S_A-S_B$, between the detected amplitudes of the A and B bursts will be, at least roughly, linearly related to the position error $X_e$. If the transducer center line 12a comes to be located more than two-sixths of a track width away from the center line $23_i$ of a particular track $22_i$ but less than four-sixths of a track width away from the same centerline $23_i$ (that is, $kW_T/2<X_e<1-kW_T/2$), the detecting portion 12b will be positioned outside of the so-called "linear zone" (LZ). The detecting portion 12b will overlap only one of the A and B bursts under this condition, and the other burst will not be detected at all. The signal difference, $e=-S_A-S_B$, will not be linearly related to the position error $X_e$. This condition is undesirable (as mentioned earlier) because the servo unit 18 (FIG. 2A) has no direct means by which to determine the magnitude of the position error, $X_e$, and therefore has no means for determining what correction current, $I_c$ is necessary for reducing the position error $X_e$ in minimal time. If such a nonlinearity condition occurs during points in time which may be referred to as the sample points of a sampling servo system (the condition occurring because the transducer centerline 12a happens by chance to be positioned in a region defined by the nonequality, $kW_T/2<X_e<W_T-kW_T/2$ [which region may also be referred to as a "forbidden" zone or "nonlinear" zone, NZ]), and the signals from the transducer are, at such sample time points, incorrectly interpreted as being linearly related to position error, $X_e$, an inappropriate correction current $I_c$ might be generated.

When the conventional "bang-bang" approach (maximum acceleration and deceleration over equal portions of the seek time) is used, there is a fair probability, roughly 1-k, that the transducer center line 12a will randomly come to rest outside the linear zone LZ, i.e., at a position between two-sixths and four-sixths of a track width away from track center, at the end of the "bang-bang" locomotion operation. This means that approximately one-third of the time, the track centering servo will not able to align the transducer with track center in minimal time because the transducer comes to rest in the forbidden (nonlinear) zone NZ.

It turns out, however, that if the level of maximum acceleration/deceleration of the transducer (which level is proportional to the magnitude of the correction current $I_c$) is judiciously selected to be a rational multiple of the track pitch per sample time squared (the sample time being the inverse of the sampling rate of digital portions of the servo unit), the transducer 12 can be made to align almost perfectly with track center at the end of a seek operation, even before the track centering servo is activated. Also, it turns out, with such a judiciously selected acceleration/deceleration level; that while the transducer is moving across tracks, the transducer center line 12a can be continuously commanded to be within a linear zone LZ of a track (i.e., exactly on track center, or $+\frac{1}{4} P_T$ away from track center, or $-\frac{1}{4} P_T$ away from track center, but not between ⅛ $P_T$ to ⅜ $P_T$ away from a nearby track center) whenever its position is to be sampled by a position correcting servo having a sampling rate equal to the inverse of the sample time. When such commanded positioning takes place for every sample point of a sampling-type servo system (one which samples the A-B signals periodically), only valid values of the position error signal, $e = \pm (A-B)$ [error signal values which are linearly related to actual position error], will be processed by the servo system and it will appear to the servo system as if the nonlinear (forbidden) zones do not exist. The servo system can then be operated to drive the transducer to a commanded position in minimal time It will be seen that when the conventional bang-bang approach (which consists of maximum acceleration and maximum deceleration modes only) is used in combination with this judiciously selected, maximum acceleration/deceleration level, the head can be brought into near alignment with track center (inside the linear zone) for some but not all values of seek distance. It will be further seen that one or more optional coast modes (zero acceleration locomotion modes) can be introduced into the seek operation to bring the head into near alignment with track center for any value of seek distance. The coast modes can be optimized so they will not significantly increase the time of the overall seek operation.

Movement of the transducer (head) 12 from a first track $22_i$ to a desired second track $22_{1+m}$ is governed by the basic physical laws of body motion, namely those governing acceleration, velocity and position. Head velocity $v_H$ may be defined as the integral taken over time of head acceleration $a_H$. Head position $x_H$ may be defined as the integral taken over time of head velocity $v_H$.

For a digital, sampling type of servo system characterized by a constant maximum acceleration/deceleration value, $a_H = \pm |A_c|$; the corresponding head velocity, $v_H$, may be determined in accordance with the following equation:

$$v_H = \int_{t=0}^{t=n\Delta t} a_H dt = A_c t \bigg|_{t=0}^{t=n\Delta t} = A_c n\Delta t + V_o \quad (1)$$

where $\Delta t$ is a predetermined, constant sampling time associated with the digital, sampling-type servo system (having a sampling frequency, $f = 1/\Delta t$), n is an integer representing a discrete number of sample times and $V_o$ is an initial head velocity at time $t=0$.

The head position $x_H$ may be similarly expressed as:

$$x_H = \int_{t=0}^{t=n\Delta t} v_H dt = \frac{1}{2} A_c t^2 + V_o t \bigg|_{t=0}^{t=n\Delta t} \quad (2)$$

$$= \frac{1}{2} A_c (n\Delta t)^2 + V_o(n\Delta t) + X_o$$

where $X_o$ is an initial head position at time $t=0$.

If the value of the maximum constant acceleration/deceleration level $A_c$ is judiciously set to equal a rational multiple of track pitch per sample time squared as indicated by the equation:

$$A_c = \frac{MP_T}{N(\Delta t)^2} \quad (3)$$

where M and N are integers, and $P_T$ is a predetermined track pitch, then the position formula (2) reduces to:

$$x_H = \frac{1}{2} n^2 \frac{M}{N} P_T + V_o(n\Delta t) + X_o \quad (4)$$

If the initial velocity $V_o$ is assumed equal to zero (as it should be at the beginning of a track seeking operation) then the following simplification results.

$$X_H - X_o = \frac{1}{2} n^2 \frac{M}{N} P_T \quad (5)$$

If the term $$\frac{1}{2} n^2 \frac{M}{N}$$

turns out to be equal to an integer, the new head position $X_H$ will be an integral number of track pitches away from the initial head position $X_o$. $(X_H - X_o = M'P_T$, where M' is an integer.) If the ratio M/N is set equal to $\frac{1}{2}$, the distance of the head away from the initial position $X_o$ will always be an integral multiple of a quarter track pitch ($\frac{1}{4} P_T$) at the end of any integral number n of sample times $\Delta t$. For the case of $k = \frac{2}{3}$, the distance $X_e$ by which the transducer is displaced away from track center will never be in the "nonlinear" (forbidden) range $kP_T/2 < X_e < 1 - kP_T/2$ at sampled points of time, $t = n\Delta t$ because half-pitch misalignment is skipped in the $N^2/4$ series: $\frac{1}{4}$, 4/4, 9/4, 16/4, 25/4, ..., etc.

The above simplified position equation, (5), should not be read to mean that the head 12 will always be positioned 24 an integral number of track pitches, $M'P_T$, for any value of n, but rather; that it can be so for some values of n. Once the magnitude of the constant acceleration/deceleration level $A_c = MP_T/(N\Delta t^2)$ is selected, the value of the ratio M/N becomes fixed (assuming a system with only one level of acceleration/deceleration being allowed). If the ratio M/N is not equal to an integer, the new head position $X_H$ will not necessarily be an integral number track pitches away from the initial position $X_o$ for every value of n. But it can be for some values of n. If the ratio M/N is set equal to an integer, then the doubled distance $2(X_H - X_o)$ will always be an integral multiple of track pitch (half of the doubled distance being covered by acceleration $a_H = +A_c$ and the other half by deceleration $a_H = -A_c$). In the presently contemplated, preferred embodiment of the invention, the ratio M/N is less than one (M/N = $\frac{1}{2}$) so this case will be described.

If the values M=1, N=2 are chosen so that the absolute value of head acceleration/deceleration $|A_c|$ is equal to one-half a track pitch per sample time squared:

$$|A_c| = \frac{1}{2} P_T/\Delta t^2, \quad (6)$$

and the head acceleration/deceleration $a_H = \pm |A_c|$ is set positive (acceleration) for half of a total seek time, where the total seek time is equal to 12 sample times, and the acceleration of the head is set negative (deceleration) for the other half, then the head position $X_H$ will be equal to 18 times $P_T$ at the end of the total seek time. Specifically, at the end of 6 sample times, the head position will be:

$$X_H = \frac{1}{4} n^2 P_T = \frac{1}{4} 36 P_T = 9 P_T \quad (7)$$

and at the end of the next six sample times (as a result of symmetry) the head will decelerate to a zero velocity and cover an equal distance of nine more track pitches. During this movement, the distance between the transducer center line and its initial position will be, at each sample point in time, $t=n\Delta t$; measured in terms of $\frac{1}{4}P_T$, $4/4P_T$, $9/4P_T$, etc., but not in terms of $2/4P_T$, $6/4P_T$, $10/4P_T$, etc. Thus, if the head 12 is initially at track center, the head will not be found within the forbidden zones, NZ, between track centers when its position is tested at a sample time point $t=n\Delta t$.

Figure 3A:
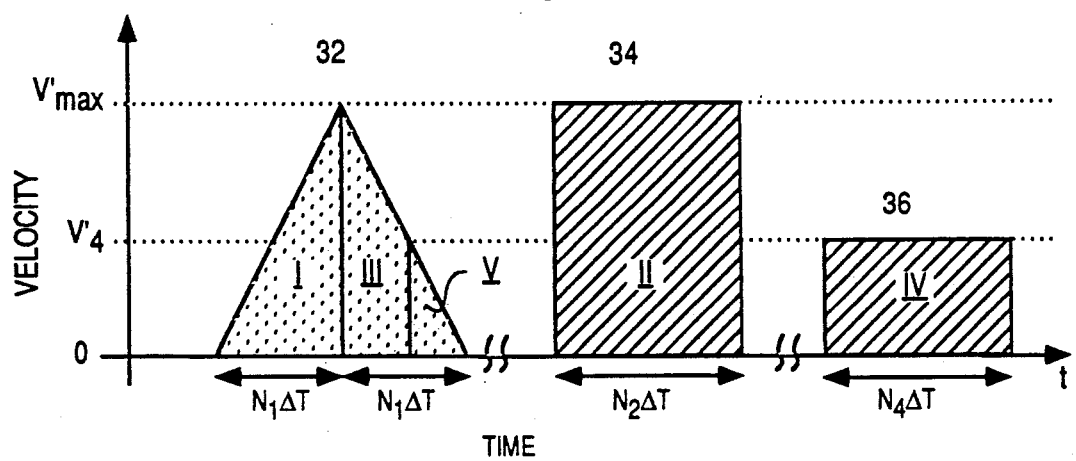
FIG. 3A is a plot of various velocity versus time profiles that may be used to move a transducer from a first position to a second position.

The above example may be appreciated visually by referring to FIG. 3A wherein an isosceles-triangular velocity profile 32 is shown in a plot of velocity $v_H$ versus time t. Distance $X_H$ traveled by the head is equal to the area under the velocity versus time curve. If head acceleration is of a constant absolute value, $a_H = \pm |A_c|$, over the symmetrical acceleration/deceleration motion that is indicated by the isosceles-triangular velocity profile 32, the peak velocity $V_{Hpk}$ at the midpoint of the triangle; after acceleration for a duration $t_1 = N_1 \Delta t$ (the number $N_1$ being an integer denoting a preselected number of sample times $\Delta t$) will be simply $V_{Hpk} = t_1 A_c$. Rewritten, this becomes:

$$V_{Hpk} = N_1 \Delta t (MP_T / N\Delta t^2) = \left(\frac{N_1 M}{N}\right) \frac{P_T}{\Delta t}.$$

As can be seen, the peak velocity $V_{Hpk}$ is a rational multiple of track pitch per sample time. Distance traveled, $d_1$, during this first duration $t_1 = N_1 \Delta t$ can be calculated as the area under the velocity profile 32 between discrete times $t=0$ and $t=t_1$ (the area denoted in FIG. 3A as region I of the profile 32). The area of this triangular region I is simply $d_1 = \frac{1}{2} t_1 V_{Hpk}$. Substituting $V_{Hpk} = t_1 A_c$, we get $d_1 = \frac{1}{2} t_1^2 A_c$. This is an important result whose significance becomes clearer when we substitute $t_1 = N_1 \Delta t$ and $A_c = MP_T/N\Delta t^2$. The traveled distance is independent of the sample time of the digital control servo:

$$d_1 = \frac{1}{2} N_1^2 \Delta t^2 MP_T / (N\Delta t^2) = \frac{1}{2} N_1^2 MP_T / N.$$

For the sake of convenience, we can normalize the measurement of time into integral units of sample time, that is $N_1 = t_1 / \Delta t$, and we can normalize the measurement of acceleration into units of pitch per sample time squared, $A_1 = A_C / (P_T / \Delta t^2)$. We can further normalize the measurement of distance into units of pitch $D_1 = d_1 / P_T$.

If the absolute magnitude of the constant acceleration, $A_c$, is set equal to one-half pitch per sample time squared, $A_1 = \frac{1}{2}$, the peak velocity and the distance traveled after $N_1$ sample times work are respectively, $V_{Hpk} = \frac{1}{2} N_1$ pitches per sample time, and $D_1 = \frac{1}{4}(N_1)^2$ pitches. It should be noted that the peak velocity $V_{Hpk}$ is proportional to the square root of the square number, $(N_1)^2$. The importance of this relation will become apparent shortly, when we explain FIG. 3B. It should also be noted that distance traveled $X_H$ (equation 5) is always measured in quarters of track pitch $P_T$ so that, at any sample point in time, $t=n\Delta t$, the transducer will be positioned in the linear zone LZ of an overlapped track for a transducer having a head width value $kW_T$ of approximately $\frac{2}{3} P_T$.

Before leaving FIG. 3A, we should consider the characteristics of the rectangular velocity profile 34, (region II). In this profile 34 the velocity is held constant at $V_{Hpk} = V_{max}$ for a time period $t=0'$ to $t=N_2\Delta t$. The distance traveled during that period is $d_2 = N_2 \Delta t V_{Hpk} = N_2 N_1 A_1 P_T$, or in the normalized form, $D_2 = N_2 N_1 A_1$. Note that this distance $d_2$ can be an integral multiple of track pitch $P_T$ for certain values of $N_2 N_1 A_1$. By way of example, if $A_1 = \frac{1}{2}$, then the term $N_1 N_2$ should be an even integer, and if at least $N_1$ is an even integer, the first distance $D_1 = \frac{1}{4}(N_1)^2$ will also be an integral number of track pitches. Thus, for properly selected values of $N_1$ and $N_2$, the transducer can be positioned an integral number of track pitches away from its original position (track center of initial track) after following velocity profiles 32 and 34. If equation (4) is studied carefully, it will become apparent that, while the transducer is moving, either at constant acceleration $A_c$ or constant velocity $V_o = V_{Hpk}$ ($a_H = 0$), head position will be within the linear zone LZ of the nearest track for each sample point in time $t=n\Delta t$ when head width $kW_T$ is approximately two-thirds of a track pitch.

Next, consider the rectangular velocity profile 36 of FIG. 3A (Region IV) wherein the velocity is held constant at $V_H = V_4 = V_{Hpk}/K$ for a time period $t=0''$ to $t=N_4\Delta t$, the value K being a number greater than one. The distance traveled during that period is $d_4 = N_4 \Delta t V_4 = N_4 (N_1 A_1/K) P_T$. Note that this distance $d_4$ can also be an integral multiple of track pitch $P_T$ for certain values of $N_4$, $N_1$, $A_1$ and K.

Also it should be noted that in FIG. 3A, the triangular velocity profile 32 is suitably partitioned into regions III and V at the point where the nonpeak velocity $V_4$ crosses its trailing side.

Figure 3B:
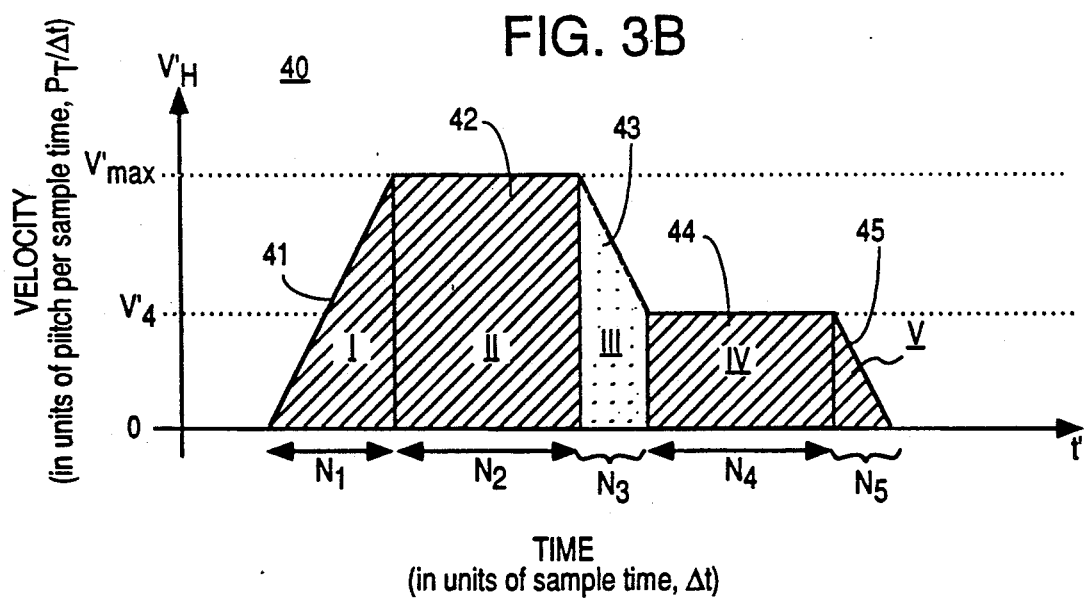
FIG. 3B is a normalized velocity versus time plot showing the profiles of FIG. 3A rearranged in a first combined form according to the invention.

Referring now to FIG. 3B, the regions I, II, III, IV and V can be rearranged as shown to produce a first continuous velocity profile 40 in accordance with the invention. That profile 40 comprises an acceleration mode 41 ($a_H = A_c = MP_T/N\Delta t^2$) having a first (normalized) duration $N_1$; a first optional coast mode 42 ($a_H = 0$) of a second duration $N_2$; a first deceleration mode 43 ($a_H = -A_c$) of a third duration $N_3$; a second optional coast mode 44 ($a_H = 0$) of a fourth duration $N_4$; and a second deceleration mode 45 ($a_H = -A_c$) of a fifth duration $N_5$. The durations $N_1$-$N_5$ (which in unnormalized form, can be written as $N_1\Delta t$ through $N_5\Delta t$) may be adjusted, in accordance with a procedure to be described shortly, so that distance traveled by the head during the period $t=0$ to $t=(N_1+N_2+N_3+N_4+N_5)\Delta t$ is equal to an integral multiple of the track pitch, $M'P_T$, the multiplier $M'$ being an integer representing a desired seek-distance.

Figure 5A:
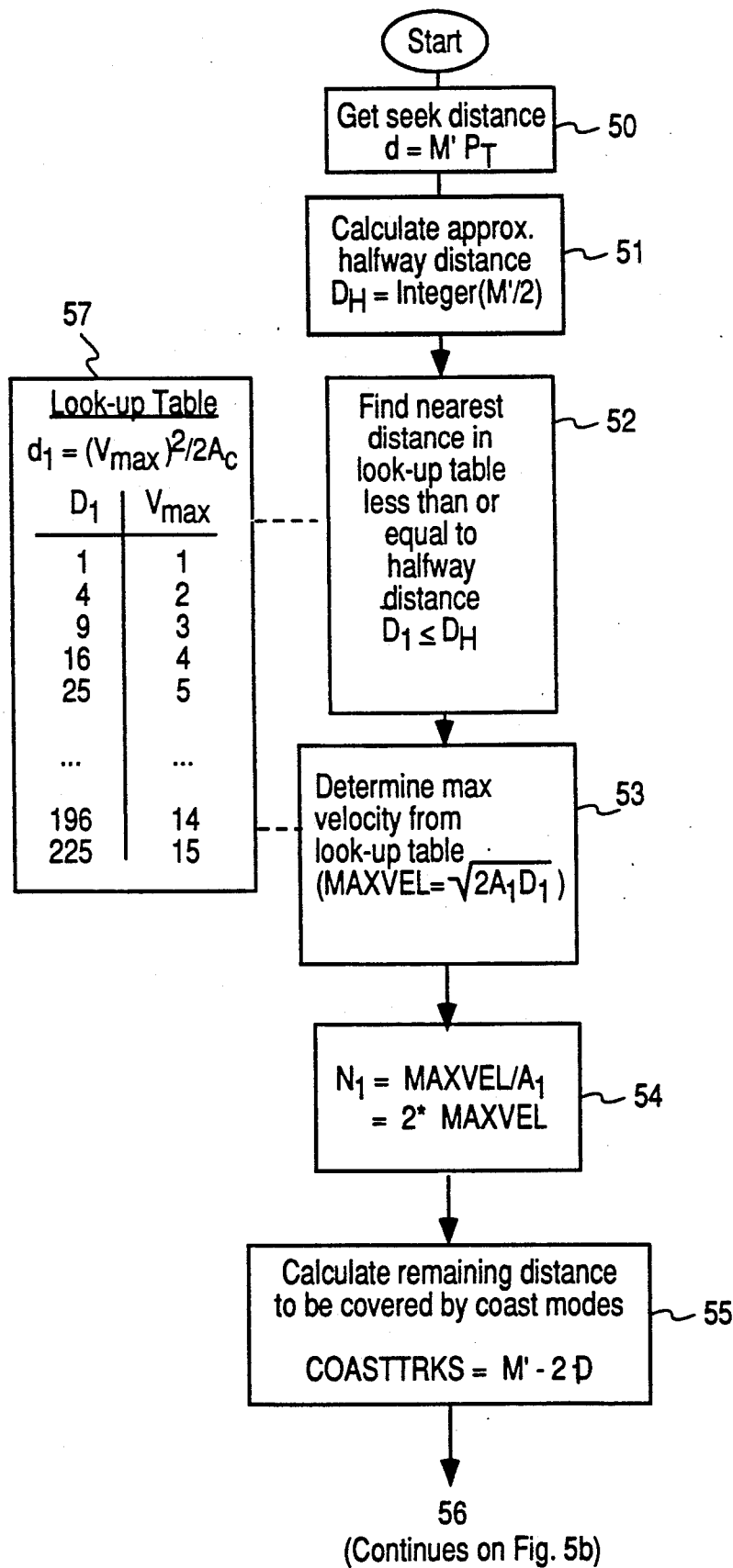
FIGS. 5A and 5B show a flow chart of a method for generating the duration values of the acceleration profiles of FIGS. 4A and 4B.
Figure 5B:
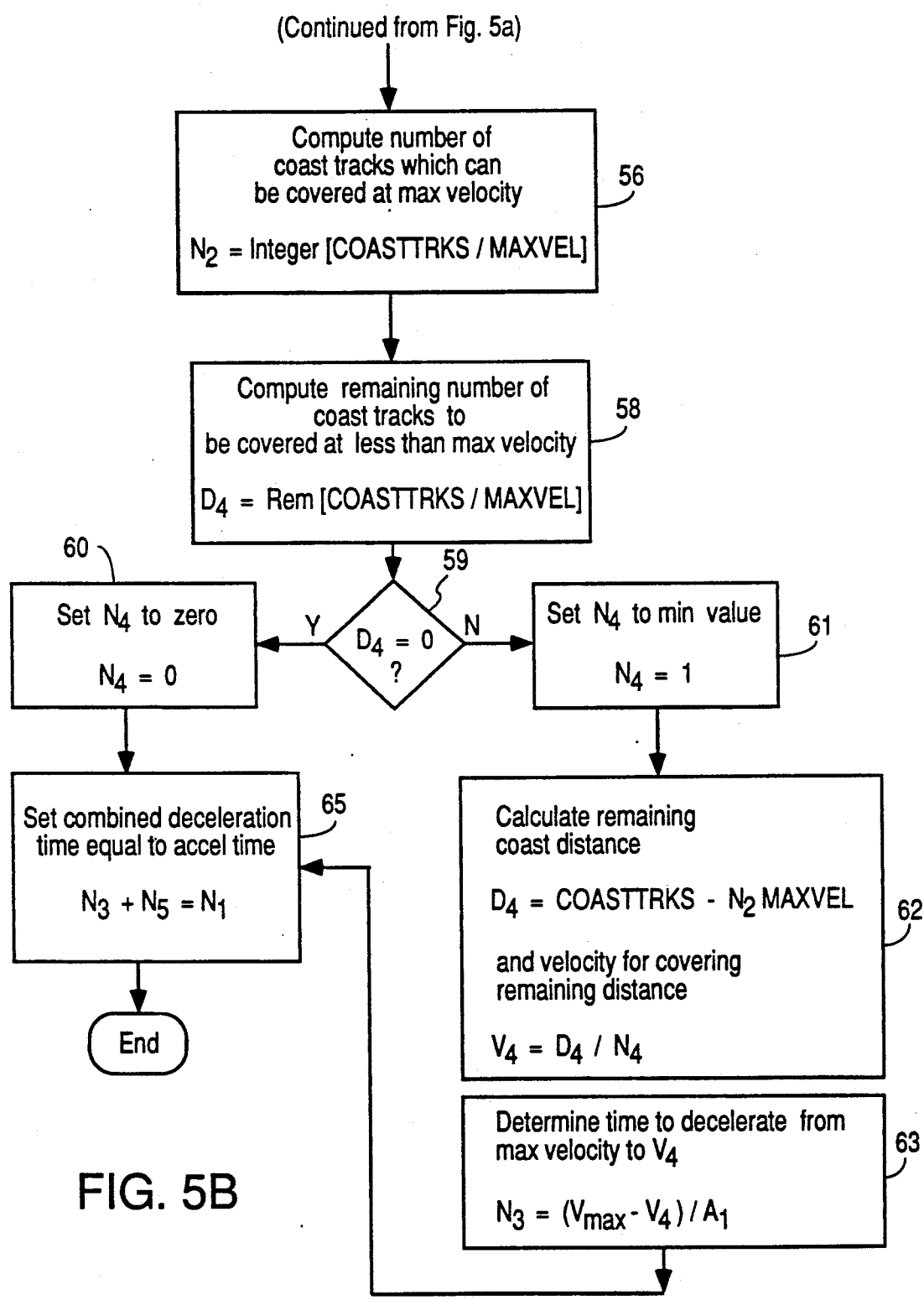
Figure 5A:
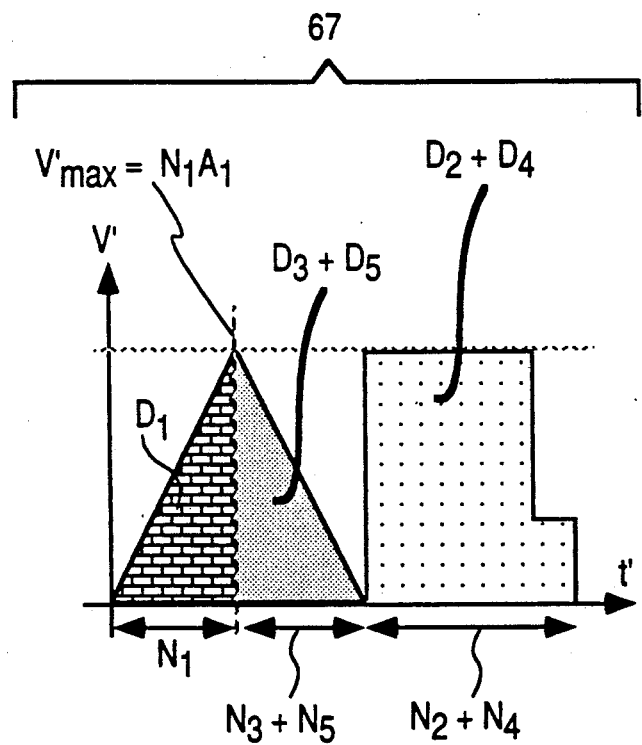

Referring to the flowchart of FIGS. 5A and 5B, the desired seek-distance $d = M'P_T$ is obtained at step 50 and the pitch multiplier $M'$ is divided roughly in half at step 51, (i.e., by means of a binary shift right operation wherein the remainder is dropped) to obtain an approximate halfway distance $D_H$. At step 52, the largest square integer $D_1 = V'^2_{max}/2A_1$ less than or equal to the halfway distance $D_H$ is found in a look up table 57 composed of sequentially arranged square numbers, $D_1 = 1^2, 2^2, 3^2, \ldots, 15^2$ and their corresponding square roots, $V'_{max} = 1, 2, 3, \ldots, 15$; ($D_1 \leq DH$). The apostrophe in the symbol $V'_{max}$ indicates, incidentally, that it is a normalized measure of velocity expressed in terms of track pitch per sample time, $V_{max} = V'_{max} P_T/\Delta t$. A maximum velocity value MAXVEL is set equal to the corresponding square root value, $V'_{max}$ of the selected square number $D_1$, that is, MAXVEL=$(D_1)^{\frac{1}{2}}$ at step 53. (The acceleration is assumed here to be one half a track pitch per sample time squared. The general equation is MAXVEL=$(2A_1D_1)^{\frac{1}{2}}$ If a different value of $A_1$ is chosen, a suitable look-up can be constructed according to the general equation.)

At step 54, the number of discrete sample times, $N_1$, required for reaching this maximum velocity MAXVEL is calculated by dividing the maximum velocity by the acceleration value $A_1$. The acceleration value $A_1$ is, again, one that has been judiciously selected to be a rational multiple of track pitch per sample time squared, in accordance with the previous discussion. Here, the acceleration is preferably set equal to an integral power of one-half, times the track pitch per sample time squared, $A_c=(\frac{1}{2})^n P_T/\Delta t^2$. Calculation of the first duration $N_1$ can then be conveniently performed, if desired, with a binary shift-left operation. For the case of $A_C=\frac{1}{2}P_T/\Delta t^2$, the duration of the first acceleration mode 41 may be simply set as $N_1$=2*MAXVEL (step 54).

Referring to the explanatory graph 67 (FIG. 5A') at the side of step 53, it can be seen that we have thus far constructed half of an isosceles-triangle shaped velocity-versus-time profile, which will carry the transducer a distance of $2D_1$. In certain cases, where M'=$2D_1$, this isosceles triangle profile is all that will be needed to travel the desired seek distance d=M'$P_T$. In all other cases, one or more coast modes are constructed to carry the head for the remaining distance M'$P_T$−$2D_1P_T$.

The value of the first traveled distance $D_1$ is doubled and subtracted from the desired seek-length multiple M' at step 55 ($D_2+D_4$=M'−$2D_1$) in order to determine a summed distance referred to as "coast-tracks" (COASTTRKS). The result, COASTTRKS=M'−$2D_1$, is divided by the maximum velocity, MAXVEL, at step 56 (FIG. 5B) to determine the duration $N_2$, if any, of the first optional coast mode 42. If the result of this division is zero, and there is no remainder ($D_4$=Rem (COASTTRKS/MAXVEL)=0), the optional first and second coast modes, 42 and 44 are not required. Track center will be arrived at simply with the acceleration/deceleration modes 41, 43 and 45; and the latter two modes can be merged into a continuous deceleration having a duration $N_3+N_5=N_1$ (step 65). This is the situation where M' is exactly equal to $2D_1$ as just described above.

If the result of the division is nonzero and the division does not produce a remainder, only the first optional coast mode 42 is needed; the second optional coast mode 44 will not be required and again, modes 43 and 45 may be merged. The approximate center of the desired track will be arrived at with modes 41, 42, 43 and 45.

If the division [COASTTRKS/MAXVEL] does produce a remainder (test performed at step 59), then the duration of the second optional coast mode 44 is preferably set equal to a minimal nonzero value necessary for completing the distance M'$P_T$. For the case of $A_1=\frac{1}{2}$, one sample time ($N_4\Delta t=(1)\Delta t$) will always work (step 61).

The distance traveled during the first coast mode 42, if such a coast mode is required, is $D_2=N_2$ MAXVEL. The remaining distance to be coasted through is calculated as $D_4$=COASTTRKS−$N_2$MAXVEL at step 62. The velocity of the second coast mode 44 then becomes set to $V_4=D_4/N_4$. (No division is needed when $N_4$ equals one.) The duration $N_3$ of the first deceleration mode 43 is set such that the head velocity $V_4$, at the end of duration $N_3$, will be equal to the remainder distance, $D_4$=Rem[COASTRKS/MAXVEL], divided by the minimum sample time $N_4$. (Steps 62 and 63).

The duration $N_5$ of the second deceleration mode 45 is set equal to the difference between the duration of the first acceleration mode 41 and the duration of the first deceleration mode 43, $N_5=N_1−N_3$ at step 65. If the second coast mode is not needed ($N_4$=0), the durations $N_3$ and $N_5$ are continuous and do not have to be individually set (steps 60, 64, 65).

Referring back to FIG. 3B, it can be seen that when the above-described method for setting the values of durations $N_1$ through $N_5$ is utilized, the transducer head will be coasting at a maximum velocity $V_{max}$ during the first optional coast mode 42 for the sample time duration of $N_2$ and it will be coasting at less than maximum velocity, $V_{max}$ for the minimized duration $N_4$ of the second optional coast mode 44. Since the fourth duration $N_4$ is set equal to either zero or the minimum sample time (1)$\Delta t$, it can be said that seek time is optimized.

The seek time $t_{seek}=(N_1+N_2+N_3+N_4+N_5)\Delta t$ of the velocity profile operation 40 (FIG. 3B) may at times be larger than the seek time of a conventional, bang-bang style velocity profile, but the difference is usually small. If the head 12 is not moving at maximum acceleration or maximum deceleration, it is for the most part, moving at maximum velocity. And, of course, at the end of velocity profile 40, the head 12 is traveling at approximately zero velocity and it is positioned very close to track center (inside a linear zone), $X_H=X_o+M'P_T$. Overall disk access time, $t_{access}=t_{seek}+t_{center}$, is reduced because the head consistently comes to rest within the linear zone and thus the track centering time $t_{center}$ can be minimized. The small increase in $t_{seek}$ is more than offset by the decrease in the track centering time $t_{center}$.

Referring momentarily back to the look-up table 57 of FIG. 5A, it will be noted that the largest listed maximum velocity $V'_{max}$ is 15 pitches per sample time. When the seek distance M' becomes much larger than 550 tracks (2*$15^2$), the duration of the first optional coast mode 42 (duration $N_2$) begins to grow rapidly under the preferred velocity profiling method and eventually the duration $N_2$ dominates the profile 40. In a preferred embodiment of the invention it is desirable to limit the head velocity $V_H$ so as not to exceed this largest $V_{max}$ value, which by way of example, is set equal to 15 $P_T/\Delta t$. The reason for such velocity limitation has to do with the length of the track address blocks ADR. If head velocity is not limited, it would become possible for a radially moving transducer to overlap more than two ADR blocks during the time span of a single track-address determining operation. The purpose of the Gray code would be defeated. More than one bit in the address data that is read from the Gray-coded ADR blocks would fluctuate and become indeterminable. The error resolution of the next-to-be-described servo loop would be undersirably affected under such a condition. Accordingly, an ADR-block-length determined limit (i.e 15 $P_T\Delta t$) is placed on $V_{max}$. The servo loop will be described with reference to FIG. 6. Aspects of the invention which are shown in FIGS. 3C, 4B, 4C and 4D will be explained afterwards.

Figure 6A:
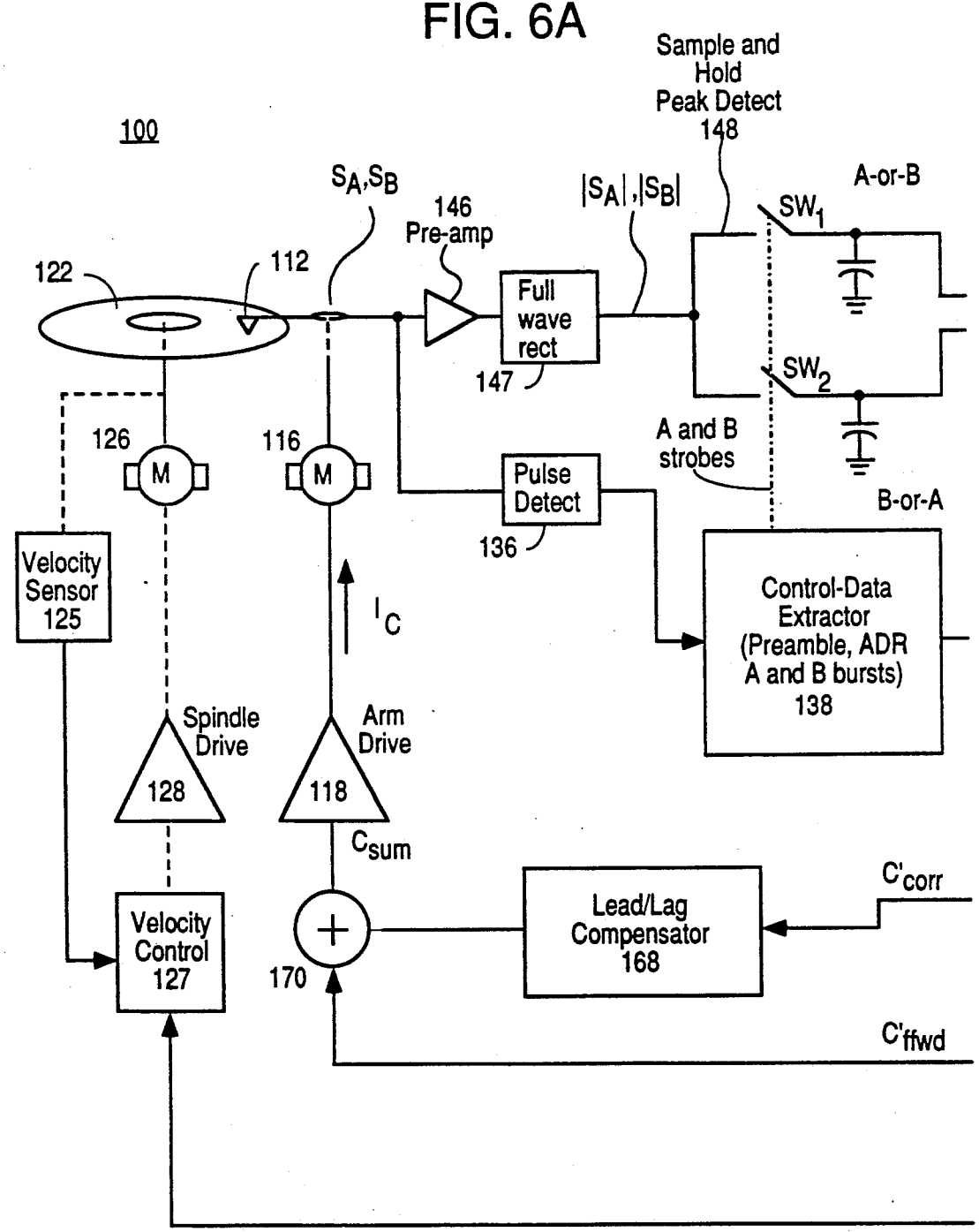

FIGS. 6A, 6B are a block diagram of a track seeking and centering servo system 100 in accordance with the invention. The system 100 comprises a plurality of magnetic hard disks 122 mounted one above the next (only one shown) which are rotated by a spindle motor 126. The spindle motor is driven by a suitable drive amplifier 128 and the latter is controlled by a velocity control loop including a Hall-effect sensor 125 and a velocity holding module 127. When the disk 122 reaches full speed, this information is relayed to a control unit 160 to indicate that data from the disk 122 can be properly read.

A plurality of magnetic heads 112 (only one shown) are coupled to, and moved radially across their respective disks 122 by, an arm motor (or voice coil) 116. Analog servo burst signals, $S_A$ and $S_B$, are coupled from a selected one of the transducer heads 112 into the input side of an analog preamplifier 146 where the signals are amplified. After amplification the servo signals are rectified in a full wave rectifier 147 and then transmitted to a sample and hold peak detector 148. The peak detector 148 transforms the rectified servo bursts, $|S_A|$ and $|S_B|$, into respective analog amplitude signals A-or-B and B-or-A. These amplitude signals, A-or-B and B-or-A, are respectively coupled, in a soon-to-be-explained selectively switched manner, to one and another of the positive and negative input terminals of a differential amplifier 149 to generate an analog error signal $e = \pm(A-B)$.

The alternate sign of the error signal, e, arises from the fact that (refer back to FIGS. 2A and 2B) the A and B servo bursts are alternately oriented at either the OD or ID side of track center 23 depending on whether the track is evenly or oddly numbered (according to its physical track number, not its Gray coded track address ADR). If negative feedback is to take place, the sign of the error signal $e = \pm(A-B)$ should indicate whether the head controlling current $I_c = f(A-B)$ is to drive the head toward the outer diameter OD or inner diameter ID of the disk in order to reduce the misalignment error $X_e$. Accordingly the rectified servo bursts $|S_A|$ and $|S_B|$ are switchably routed to one and the other of the positive input terminal (+) and the negative terminal (−) of the differential amplifier 149 depending on whether the current track number (determined by current ADR) is odd or even. A single chip, pulse and embedded servo detector, such as the DP8468B (available from National Semiconductor of Santa Clara, Calif.) is preferably used for implementing the functions of elements 147, 148, 149 of FIGS. 6A, 6B and the now to be described pulse-detecting element 136 of FIG. 6. The SSI 511 amplifier chip available from Silicon Systems of Tustin, Calif. is preferably used for the preamplifier 146.

So far we have assumed that only the servo burst signals $S_A$ and $S_B$ are being fed into the preamplifier 146. But this is not true. All the signals on the disk track are detected by the transducer 112 and transmitted to the preamplifier 146. The servo bursts $S_A$ and $S_B$ have to be isolated from the rest of the signal stream by means of time domain multiplexing. The phase-coherent preamble PRE* serves as a reference mark.

Bit signals from the disk 122 are detected by a pulse detector 136 (integrally provided inside the DP8468B chip) and supplied to a control data extractor 138. The extractor 138 (preferably fabricated as a single chip ASIC [application specific integrated circuit] having suitable combinatorial logic), locates the preamble section PRE* in the bit stream arriving from the pulse detector 136 and generates various timing signals including strobes identifying the time slots of the A and B servo bursts. The extractor 138 also determines whether the track number represented by the current ADR* block is odd or even and generates a binary coded signal $T_{measured}$ representing the current (measured) track number (Gray code to binary code conversion takes place according to the formula: $B_m = G_m$, $B_n = B_{n+1}$ XOR $G_n$, where $B_i$ and $G_i$ are respective binary and Gray bits at the "i"th position of their corresponding data words and $i = m$ at the most significant bit position.) Additional details concerning the extractor 138 (not directly related to the invention that is claimed here) may be found in the earlier referenced, copending application Ser. No. 07/276,272 of M. G. Machado, et al., entitled "TRACK ADDRESS DETECTING MEANS BY HDD SECTOR SERVO METHOD," which was filed Nov. 23, 1988, and assigned to the assignee of the present application. The disclosure of said copending application (as stated earlier) is incorporated herein by reference.

During the time slots of the A and B bursts, the extractor 138 closes switches $SW_1$ and $SW_2$ within the peak detector 148 to switchably route the rectified $|S_A|$ and $|S_B|$ signals respectively to one and the other of the positive (+) and negative (−) input terminals of the differential amplifier 149 in accordance with whether the current track number is odd or even.

An analog-to-digital converter (A/D) 150 converts the analog error signal, $e = \pm(A-B)$ into a digital signal E' whose bits represent both the sign and the magnitude of the error signal e. This error signal E' is supplied to a digital control unit 160 in sampled fashion (sampling rate $= 1/\Delta t$) together with the extracted track number $T_{measured}$. In response, the control unit 160 produces respective, anticipatory and correction command signals, $C_{ffwd}$ and $C_{corr}$, for moving the head 112 to a desired track, $T_{desired}$. The value of the desired track number, $T_{desired}$ is determined by an external data requesting device (host) 210.

The subscript, "ffwd", of the reference to the anticipatory command signal $C_{ffwd}$ is an abbreviation for "feed-forward" and is intended to indicate that the control unit 160 anticipates approximately what command value will be required for producing a desired level of acceleration/deceleration ($A_c$) or velocity $V_o$ even before the correction command $C_{coor}$ is produced. The value of the anticipatory command signal $C_{ffwd}$ is selected so as to approximately move the transducer at the desired acceleration/deceleration levels ($+A_c$, $-A_c$) and coast velocities ($a_H = 0$). The necessary value of $C_{ffwd}$ may be determined by manual characterization of the disk drive or by automated self-characterization (during disk drive initialization), as may be convenient.

Figure 4A:
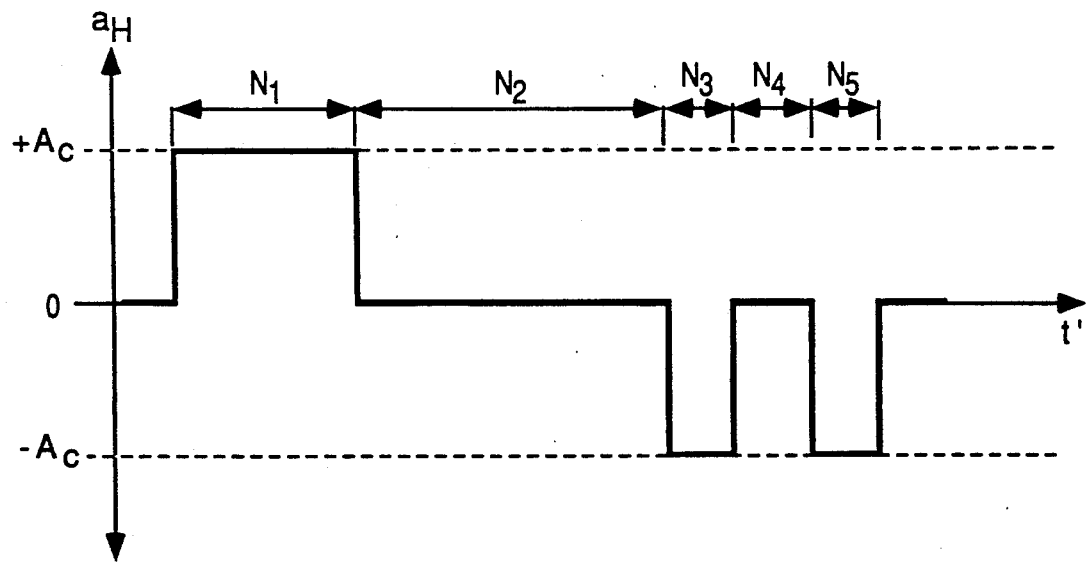
FIG. 4A is a plot of a first acceleration versus normalized-time profile corresponding to the velocity profile of FIG. 3B.
Figure 4B:
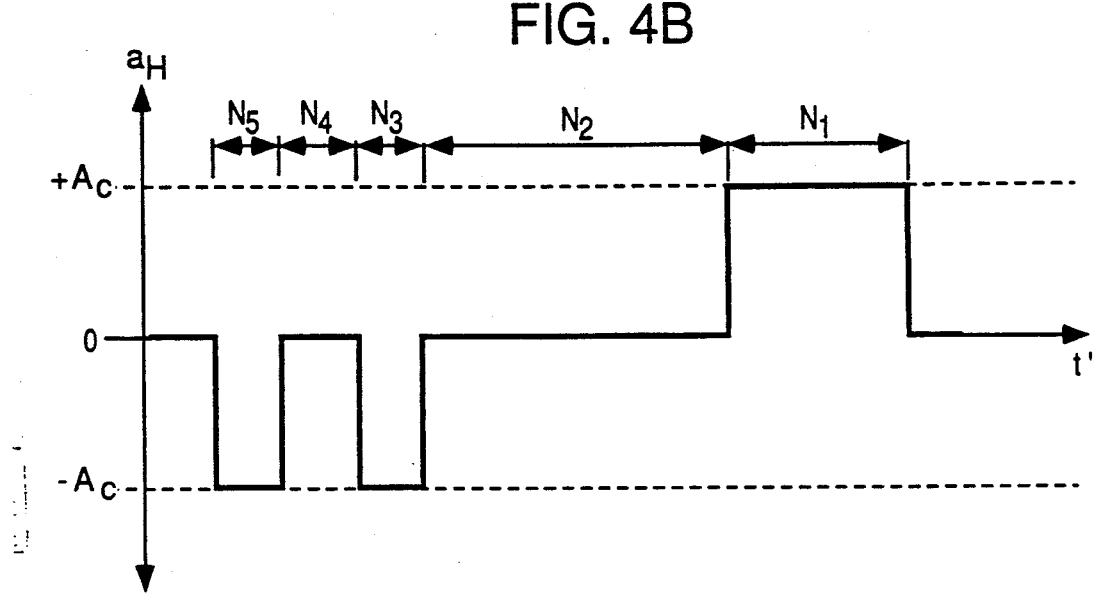
FIG. 4B is a plot of a second acceleration versus normalized-time profile corresponding to the velocity profile of FIG 3C.
Figure 4C:
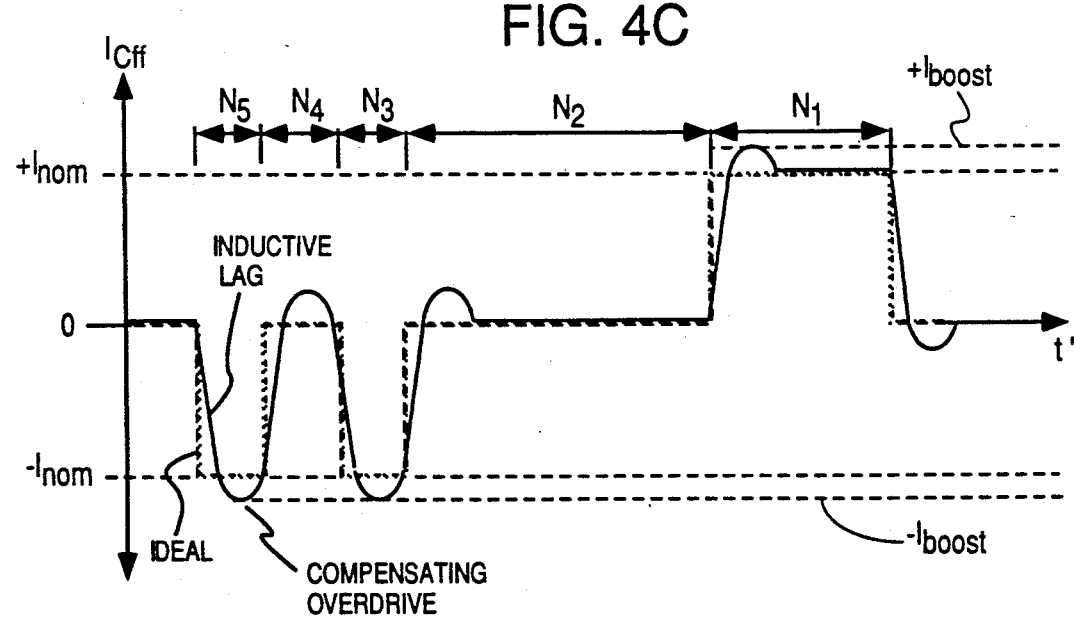
FIG. 4C is a plot of a feed-forward portion of control current versus time corresponding to the acceleration profile of FIG. 4B.

The command signals, $C_{ffwd}$ and $C_{coor}$, are respectively supplied to feed-forward and correction digital-to-analog converters (DACs) 162 and 164 as shown in FIGS. 6A, 6B. The analog output signal, $C'_{ffwd}$, of the feed-forward DAC 162 is fed directly into a command signal summation means 170. The analog output, $C'_{corr}$, of the correction DAC 164 passes through lead/lag compensator 168 before arriving at the summation means 170. The lead/lag compensator 168 functions to stabilize the feedback loop of the correction command signal $C_{coor}$. Suitable pole-zero methods for inhibiting undesired oscillations in a servo loop, may be used as is well known in the art, for constructing the lead/lag compensator 168. Its details do not need to be discussed here. The waveform of a feed-forward current $I_{cff}$ generated by the anticipatory command $C_{ffwd}$ is shown in FIG. 4C and will be discussed in detail later.

The command signal summation means 170 supplies a summed command signal $C_{sum}$ to an arm driving amplifier 118. This arm driving amplifier 118 converts the summed command signal $C_{sum}$ into the control current $I_C$ which controls the position of the transducer 112. (The driver 118 can, by way of example, be fabricated of the ML4402 Servo Driver chip available from Micro Linear of San Jose, Calif.)

The control current $I_C$ passes through one or more windings of the arm motor 116 and controls not only the position, but also the velocity and acceleration of the transducer head 112. When the transducer head 112 is in a static position relative to track center, the control current $I_C$ generates static balancing forces. (commanded by a $CR_{static}$ value which will be later discussed) in the arm motor 116 to overcome static counter forces such as those generated by the flexible cable 21 (FIG. 1). When the transducer head 112 is moving rapidly from an initial track $22_i$ to a destination track $22_{i+m}$, the control current $I_C$ provides sufficient force for overcoming dynamic resistances and for moving the transducer head in accordance with one of the velocity profiles shown in FIGS. 3B and 3C. When the head 112 comes to rest in the linear zone of the desired track $22_{i+m}$, the control current $I_C$ provides the necessary corrective forces for precisely aligning the transducer 112 with the track center $23_{i+m}$.

The control unit 160 receives requests for a new track of data from a host controller (requesting device) 210 over a smaller computer standard interface (SCSI) bus. A velocity profiling section 200 within the control unit 160 receives the logical track number of a desired disk track (cylinder) from the requesting device 210, converts the logical track number into a physical track number $T_{desired}$ in accordance with a table of logical and physical track numbers stored inside a track register (not shown) of the profiling section 200.

Figure 3C:
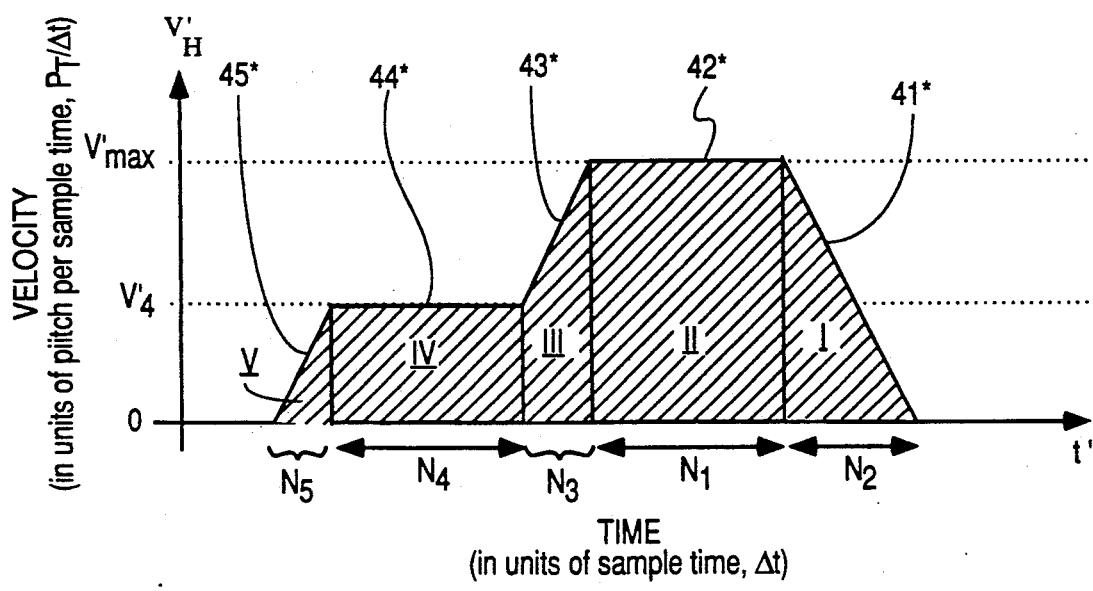
FIG. 3C is a normalized velocity versus time plot showing the profiles of FIG. 3A rearranged in a second combined form according to the invention.

The profiling section 200 then calculates the desired seek distance $M' = T_{desired} - T_{current}$ using a suitable computer program stored in a memory portion thereof (not shown), computes the various acceleration, coast and deceleration mode durations $N_1$-$N_5$ in accordance with the method illustrated in the flow chart of FIGS. 5A and 5B, and generates an anticipatory command $C_{ffwd}$ and an expected position value $T_{exp}$ in real time fashion for realizing the profiles of FIGS. 3B and 3C, as will be explained shortly.

In the preferred embodiment, the control unit 160 together with the A/D converter 150 are realized in the form of a single chip microcontroller such as the 68HC11 integrated circuit which is available from Motorola Corp. of Austin, Tex. The memory portion of the microcontroller is programmed according to programming techniques well known in the art to achieve the results described herein. The source and object codes of an assembly program for realizing the described results are appended hereto as Microfiche Appendix A. A cross-reference list of variable names used in the source code (assembly language for the Motorola 68HC11) and the corresponding value names described herein is included within Microfiche Appendix A at frames 3 and 4.

As mentioned above, once the durations $N_1$-$N_5$ are established, the microcomputer profiling section 200 enters a real time control mode wherein it continuously calculates the expected track number $T_{exp}$ of the transducer head 112, which is computed under an anticipatory assumption that the transducer head 112 will be moving in accordance with one of the velocity profiles of FIGS. 3B and 3C when its position is next sampled. The expected position is represented by an expected track number $T_{exp}$ (this expected position value does not include the fine positional, quarter track increments which are later used for adjustment of the misalignment error $X_e$ to values approximately zero to $\pm \frac{1}{4} P_T$ or $\pm \frac{3}{4} P_T$). The expected position value $T_{exp}$ is supplied to an error correcting section 300 of the control unit 160 which operates to bring the actual head position $T_{measured}$ into line with the desired (expected) position $T_{exp}$.

In the profiling section 200, the expected track number $T_{exp}$ is found simply by integrating head velocity and head position over time. This can be expressed in the form of computer source code as $V_H = V_H + A_H$ and $X_H = X_H + V_H$. The two operations are repeated for each sample of time, $\Delta t$. The acceleration value $A_H$ is either $+A_1$, $-A_1$ or zero depending on whether the current locomotion mode is an acceleration, deceleration or coast. The number of sample times required for each mode are the values $N_1$ through $N_5$ previously described.

Figure 7A:
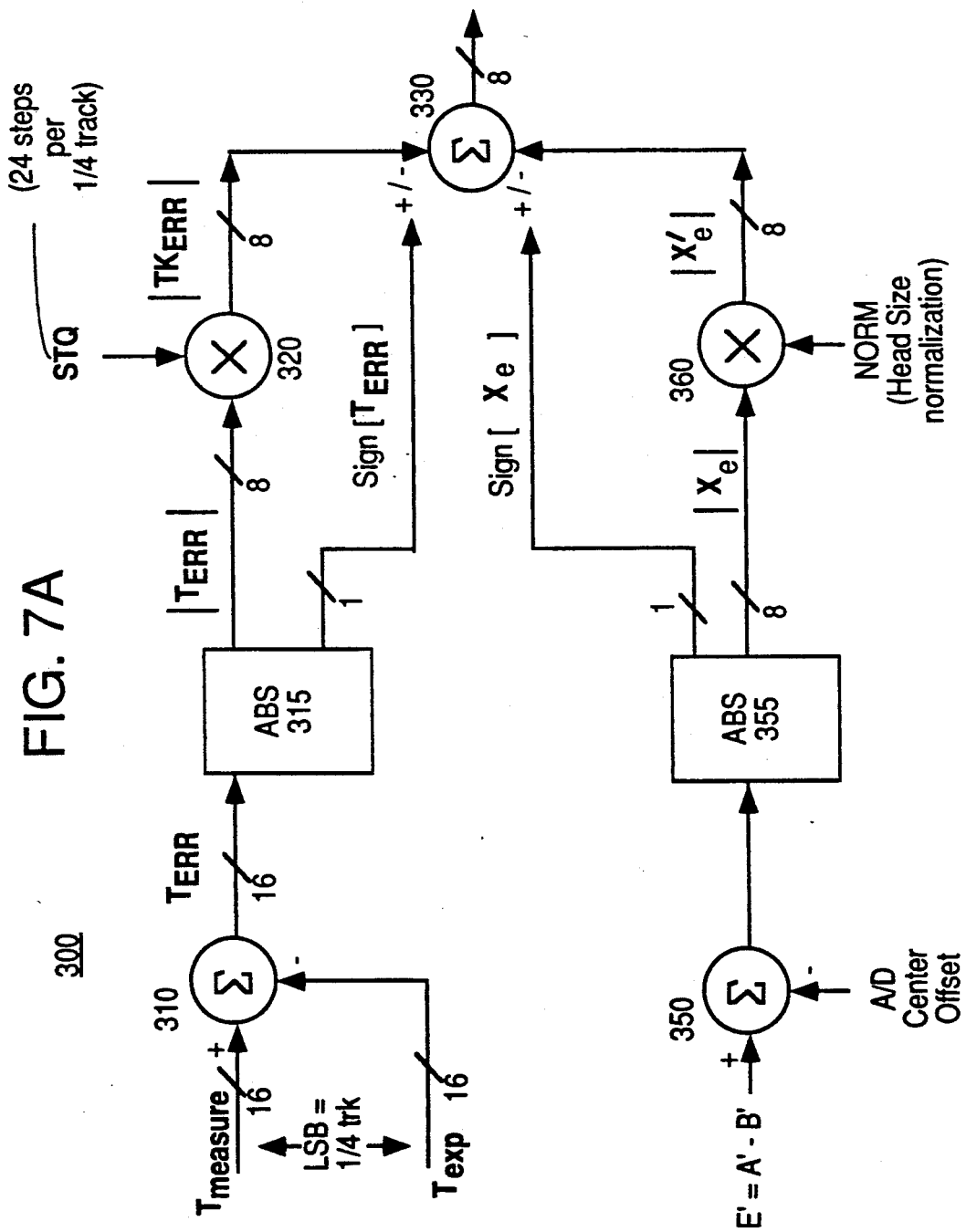
FIG. 7A, 7B are a logic diagram of an error correcting section according to the invention.
Figure 7B:
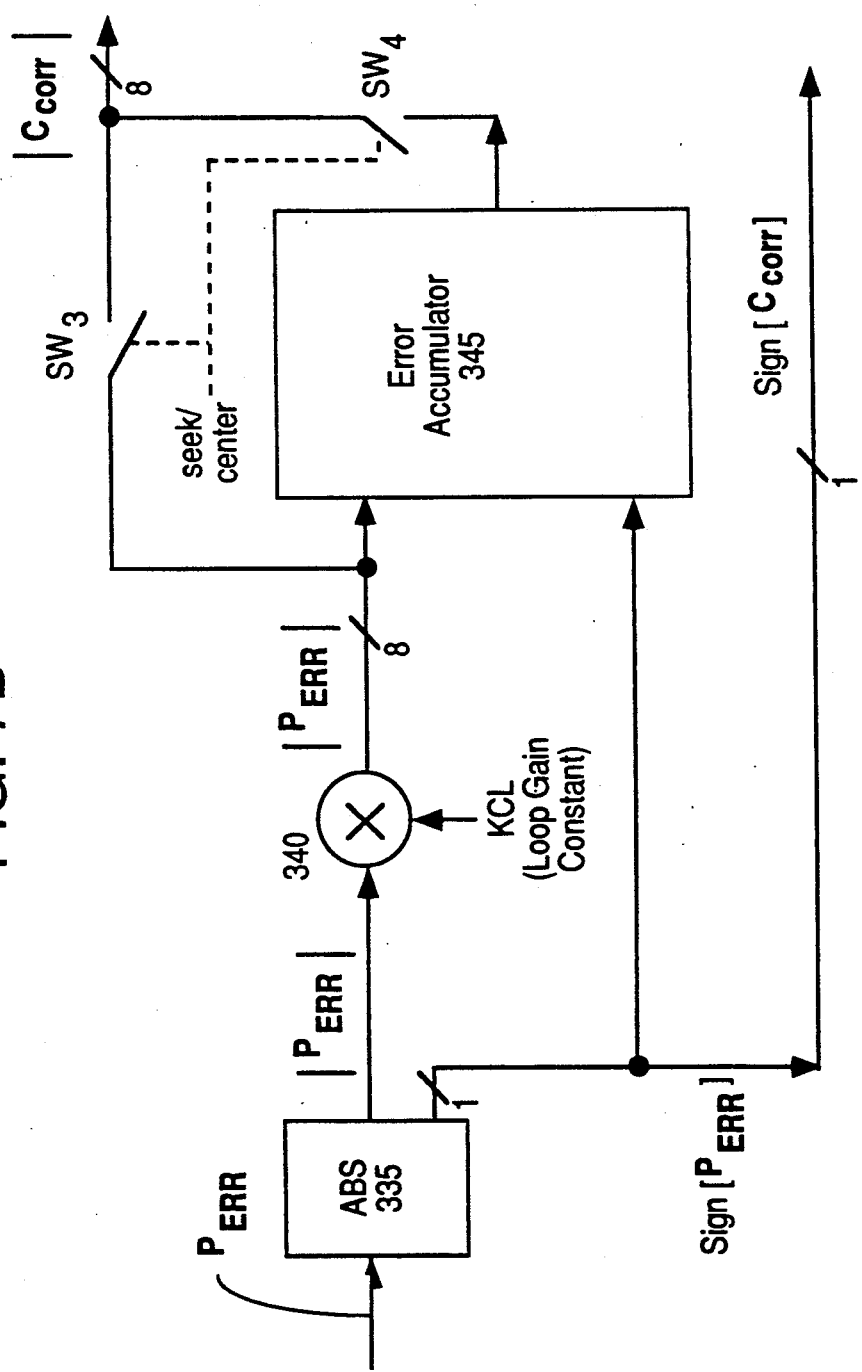

The operation of the error correcting portion 300 will be explained with reference to FIGS. 7A, 7B. The actual track number $T_{measured}$, as detected by the control data extractor 138, is fed into one side of a coarse position subtractor 310 (as a 16 bit number whose least significant bit represents a quarter of a track width) while the expected track number $T_{exp}$ is fed into a second input of the coarse position subtractor 310 (also as a 16 bit binary number whose least significant bit represents a quarter track width). It may be noted here that the least significant bit of $T_{measured}$ is always zero because the ADR address blocks do not resolve transducer position down to $\frac{1}{4}$ track increments. Transducer position is measured by the combination of the $T_{measured}$ and $E'$ signals.

A 16 bit coarse error value $T_{ERR}$ is produced by the coarse subtractor 310 and this produced value is partitioned at absolute-value function block 315 into magnitude and sign terms $|T_{ERR}|$ and $Sign[T_{ERR}]$ both of which are represented digitally. The magnitude term $|T_{ERR}|$, which is preferably 8 bits wide, is multiplied (at normalizing step 320) by a normalizing factor STQ (representing "steps per quarter track") so that the least significant bit of the multiplication result, $|TK_{ERR}|$, represents one 96th of a track width.

At step 330, the normalized track error $|TK_{ERR}|$ is combined with a normalized fine position, track centering error $|X'_e|$ (to be described later) and the combined position error value $P_{ERR}$ is partitioned at an absolute function step 335 into an 8 bit magnitude component $|P_{ERR}|$ and one bit a sign component $Sign[P_{ERR}]$. (The one-bit wide value $Sign[T_{ERR}]$ controls whether the magnitude $|TK_{ERR}|$ is added or subtracted at combining step 330.) The magnitude component $|P_{ERR}|$ is amplified by a closed loop constant, KCL, at step 340. At step 342 the amplified error signal $|P'_{ERR}|$ is switchably routed, depending on whether the control unit 160 is in a track seek mode or centering mode, to be either output directly as of the correction command signal $C_{coor}$ together with the position error direction value $Sign[P_{ERR}]$, and/or it is input into an error accumulator block 345 wherein it is integrated to generate an accumulated, static error canceling value $CR_{static}$ and this latter value is fed out to the correction DAC and 164.

Figure 8:
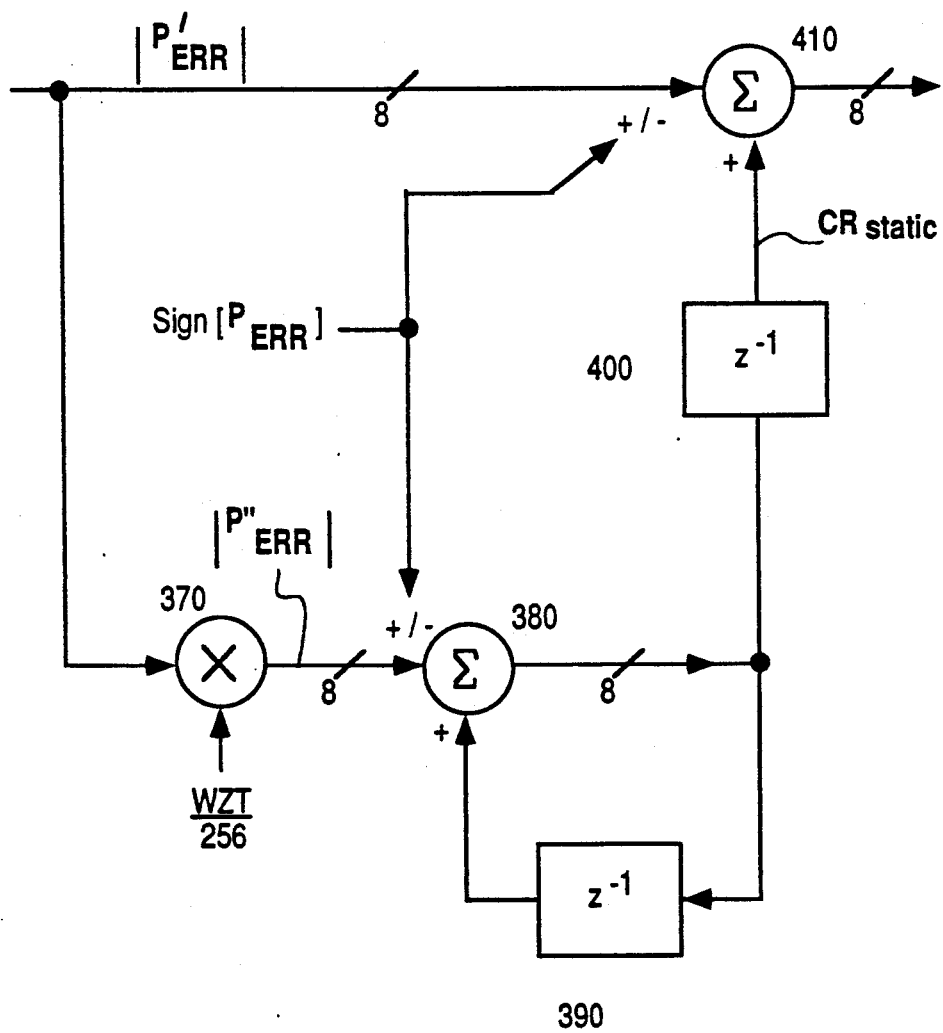
FIG. 8 shows an error accumulating section.

The details of the integration function 345 are shown in FIG. 8.

Referring to FIG. 8, the position error $|P'_{ERR}|$ entering the accumulator block 345 is multiplied by a weighting factor WZT/256 at step 370 and discretely integrated by the loop formed of summing step 380 and first delay 390. The accumulated error is delayed once more at second delay 400 and then presented as a static-force canceling command $CR_{static}$ at step 410 where it is combined with a dynamic position error value $|P'_{ERR}|$. As the transducer nears track center, $|P'_{ERR}|$ approaches zero, but there are static forces to be countered (such as the resilience of flexible cable 21) after the seek operation ends. The static canceling value $CR_{static}$ anticipates the required static forces and immediately counters them at the moment that the seek operation ends and switch SW3 (FIG. 7) is opened and switch SW4 is closed. By dynamically anticipating what static-canceling command $CR_{static}$ will be needed, the overall access time, $t_{access}=t_{seek}+t_{center}$, is minimized.

Returning to FIG. 7A, 7B, we have thus far described only the large, quarter-track resolving portion of the error correcting section 300. The course, full-track, position of the transducer is measured by the extracted track number $T_{measured}$. The fine position of the transducer is determined by the error signal E' which is produced by the A/D converter 150 and supplied to the error correcting section 300 at periodic sample times $t_n=n\Delta t$. The zero point of the A/D converter 150 is set at step 350 by adding a suitable A/D center offset value at step 350 as shown in FIG. 7. At step 355, an absolute function operation is performed and the resultant magnitude $|X_e|$ is normalized at step 360 for variations in head size between multiple transducers of a disk drive having more than one transducer. The normalized magnitude $|X'_e|$ is either added or subtracted to the course error value $|TK_{ERR}|$, depending on the 1-bit value $Sign[X_e]$ produced by the absolute function step 355. The output of combining step 330 proceeds as explained previously to produce the final correction on command, $|C_{coor}|$ and its corresponding $Sign[C_{corr}]$ as indicated in FIG. 7A, 7B.

The commanded position of the transducer is one at which the dynamic correction command $C_{coor}$ will be equal to zero. It should be noted here, that since the least significant bit of the expected position $T_{exp}$ represents a quarter of a track width, $\frac{1}{4} P_T$, the velocity profiling section 200 can only command the transducer to positions that are integral multiples of one-quarter of a track pitch away from an initial position. It will be recalled, because the acceleration level $A_C$ has been judiciously selected to be a rational multiple of track pitch per sample time squared, that the only positions which will be commanded are those of the form $d_1=n^2(M/N)P_T/2$, where $d_1$ represents distance from an initial track center. Since this distance value $d_1$ cannot equal one-half of a track pitch, or odd multiples thereof, the transducer cannot be commanded to a forbidden zone midway between two track centers. Accordingly, at each sample time $t_n=n\Delta t$, the received fine error $E'=A'-B'$ will be linearly related to the actual position error $X_e$. And as a consequence, correcting section 300 (shown in FIG. 7) should be able to reduce the magnitude of the positional error $X_e$ in minimal time using the information of both the course track error $T_{exp}-T_{measured}$ and the fine error $E'=A'-B''$.

It should be appreciated that in a world of ideal components, where unpredictable factors such as air resistance, bearing loading, etc., do not exist, the correction command $C_{coor}$ would not be required. The feed-forward command value $C_{ffwd}$ could be, under such ideal conditions, suitably set in combination with the amplifying characteristics of arm drive 118 to produce a total correction current $I_c$ which will move the transducer 112 radially across the disk 122 at precisely the aforementioned acceleration level $A_c$ or the aforementioned coasting velocities $V_{max}$ or $V_4$. (The value of the feed forward command $C_{ffwd}$ may be obtained by measuring the command versus acceleration transfer functions of plural disk drives and averaging to a value which produces the desired acceleration level $A_c$.)

Unfortunately, in the real word environment, the idealized command signal $C_{ffwd}$ brings the transducer 112 only approximately to the desired acceleration level $A_c$ or the desired coasting velocity $V_{max}$ or $V_4$. The correction signal $C_{corr}$ is required to close the gap between the ideal command $C_{ffwd}$ and the summed command $C_{sum}$ which provides the actual drive for achieving these acceleration and velocity levels.

Since the feedback loop of the correction command signal $C_{coor}$ requires time for producing a zero-error, it is preferred that as much time as possible be given to the correction loop portion 300 of the control unit to settle into a stable feedback mode when the transducer is nearing its final destination, the center of the desired track $T_{desired}$. Total distance traveled by the transducer 12 will be the same irrespective of whether the velocity profile 40 is followed forward in time, as shown in FIG. 3B or according to the mirror image velocity profile 40* (which is a time reversed replica of velocity profile 40) as shown in FIG. 3C. The difference between the profiles, 40 and 40*, is that in the latter profile, the short duration $N_4$ of the second optional coast mode 44* occurs near the beginning of the seek operation and the, often times, longer duration $N_2$ of the first optional coast mode 42* occurs near the end of the seek operation. Accordingly, there is less disturbance at the end of the acceleration profile shown in FIG. 4B (which corresponds to the velocity profile 40* of FIG. 3C) than there is at the end of the acceleration profile shown in FIG. 4A (which corresponds to the velocity profile 40 of FIG. 3B).

Figure 4D:
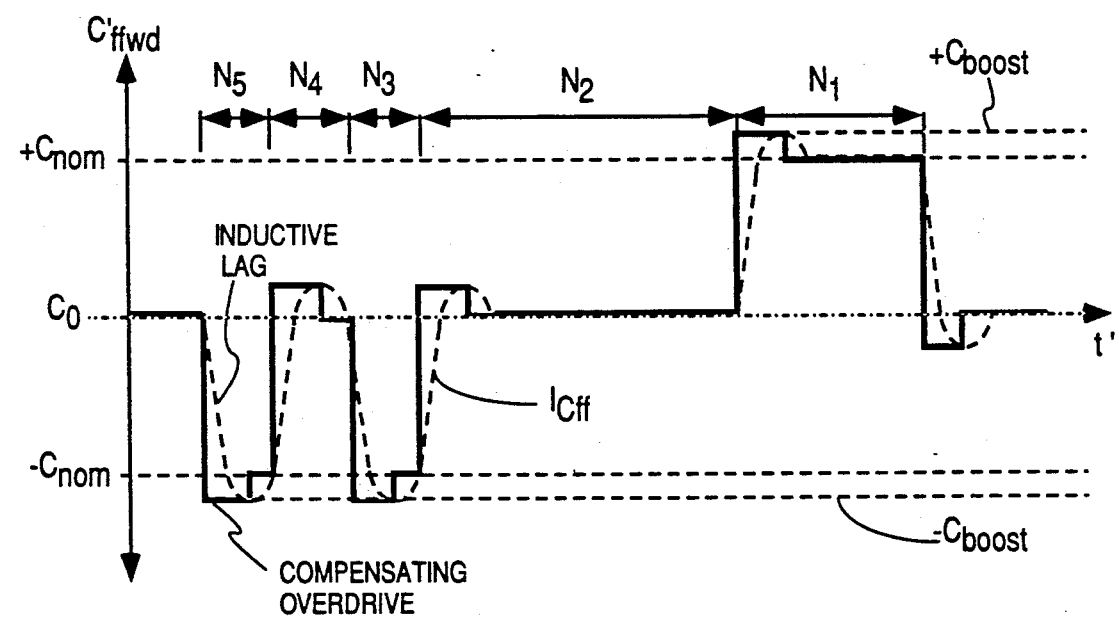
FIG. 4D is a plot of commanded current levels versus time for realizing the current waveform of FIG. 4C.

As mentioned earlier, acceleration is proportionally related to current magnitude in the windings of the arm motor 116. The step-function acceleration modes which are shown in FIGS. 4A and 4B cannot be realized in the real world with step-function control currents because there is an inherent inductive lag which is always added to the commanded current ($C_{sum}$) by the windings of the arm motor 116 so that the resultant waveform of the correction current $I_c$ is not truly step-like. In FIG. 4C the ideal step-like winding current, which would result only from the feed forward component of the correction current, $I_{Cff}$ is graphed as a dashed plot of "ideal" current so that it may be compared against the actual current waveform used in the preferred embodiment of the invention. Since the feed forward current $I_{Cff}$ will not be able to reach the nominal desired level $I_{nom}$ in zero time, the current is instead commanded to a higher, boosted level $I_{boost}$ in order to compensate for the inductive effects of the arm motor windings so that the distance traveled by the transducer during each of the durations $N_1$ through $N_5$ will essentially approximate those that would be traveled under the ideal step-function like acceleration profiles shown in either of FIGS. 4A or 4B. FIG. 4D shows the value versus time profile of the feed forward command signal $C_{ffwd}$. The specific values of the nominal and boost levels of the command signal $C_{ffwd}$ will vary from one case to the next depending on the specific characteristics of each disk drive, and as such, they are preferably derived in an empirical manner for each drive.

The above disclosure has provided both a method and apparatus by which it becomes possible to move a body (i.e., a magnetic transducer) by a total distance (i.e., seek distance) equal to an integral multiple of a predetermined pitch (i.e., the track pitch of a preselected data storing disk) in minimal time. Once the spirit of the invention is understood, those skilled in the art will no doubt be able to devise many other ways for achieving the results described herein. By way of example, while a microcontroller is used in the preferred embodiment, the various steps illustrated in FIGS. 5A and 5B may be performed by a general purpose computer or they may be performed by customized hardware components as may be desired by specific applications. Velocity and/or acceleration correction loops can be substituted for or added to the disclosed position correction loop of FIG. 7. More than two levels of acceleration/deceleration ($+A_c$, $-A_c$) which are rational multiples of track pitch may be used to move the transducer, if so desired. The acceleration, deceleration and coast motions of FIG. 3a may be subdivided and rearranged in many ways other than those specifically shown to move a transducer by a distance approximately equal to an integral multiple of pitch. The above description is intended to be illustrative only. The scope of the claimed invention is best defined by reference to the following claims.

I claim:

1. A digital servo system for moving a body by a distance equal to an integral multiple of a predetermined pitch, the digital servo system having a predetermined sampling rate and corresponding sample time, comprising:

acceleration/deceleration means for moving the body at a constant acceleration/deceleration level;

coast means for causing the body to move at a constant velocity; and control means, operatively coupled to said acceleration/deceleration means and coast means, for controlling the movement of said body so that said movement includes an acceleration mode, a first coast mode, a second coast mode, and a deceleration mode;

wherein said constant acceleration/deceleration level is equal to a rational multiple of the pitch divided by the square of the sample time;

and wherein said control means comprises;

normalization means for expressing the distance to be moved as a normalized first digital number M' representing the distance in terms of integral pitches to be moved;

half-way approximating means for generating a second digital number $D_H$ which is approximately one half the value of the first digital number M';

look-up table means for storing a first set of distance values $D_{11}, D_{12}, \ldots D_{1n}$ and a corresponding set of maximum velocity values $V_{max1}, V_{max2}, \ldots V_{maxn}$ which may be reached during a duration of $N_1$ sample times for an acceleration equal to said predetermined acceleration/deceleration level;

table search means for finding in the look-up table means the largest distance value $D_1$ in the set $D_{11}, D_{12}, \ldots D_{1n}$ which is less than or equal to the second digital number $D_H$ and the corresponding maximum velocity value $V_{max}$ of that largest distance value $D_1$ from the set $V_{max1}, V_{max2}, \ldots, V_{maxn}$;

first duration computing means for computing the number $N_1$ of sample times required for traveling the distance represented by the distance value $D_1$;

remaining distance computing means for computing the difference between the first digital number M' and twice the distance value $D_1$ found in the look up table means; and mode duration setting means for setting the duration of each of the acceleration and deceleration modes equal to the number $N_1$ of sample times computed by the first duration computing means and for setting the combined duration of the first and second coast modes such that the difference distance computed by the remaining distance computing means will be traveled in the first and second coast modes.

2. A digital servo system according to claim 1 wherein said rational multiple is equal to an integral power of $\frac{1}{2}$.

3. A digital servo system according to claim 1 wherein a forbidden zone of a width less than the pitch is located between two adjacent points that are distanced integral multiples of the pitch away from an initial position of the body and wherein the acceleration/deceleration level is selected such that at any sample point in time, the sample point being a discrete number of sample times after movement of the body commences, the body will be outside the forbidden zone.

4. A digital servo system according to claim 1 wherein the duration of the second coast mode is limited to either zero or one sample time.

5. The digital servo system of claim 1 wherein said body is a magnetic transducer and said pitch is equal to the repetition pitch of multiple tracks recorded on a magnetic disk that is to be read by said transducer.

6. A method for moving a body by a total distance equal to an integral multiple of a predetermined pitch distance, comprising:

sampling the position of the body at periodic sample times $t_n = n\Delta t$;

calculating a square distance $D_1 = (V_{max})^2/2A_c$ that is equal to or less than half the total distance where $A_c$ is an acceleration level equal to rational multiple of the pitch divided by the square of the sample time $\Delta t$;

calculating the number $N_1$ of sample times required for accelerating the body at said acceleration level $A_c$ to reach the maximum velocity $V_{max}$; and accelerating the body at said acceleration level over one or more periods of time whose total duration equals $N_1$ sample times.

7. A digital servo system for moving a body by a distance equal to an integral multiple of a predetermined pitch, the digital servo system having a predetermined sampling rate and corresponding sample time, comprising:

acceleration/deceleration means for moving the body at a constant acceleration/deceleration level;

coast means for causing the body to move at a constant velocity; and control means, operatively coupled to said acceleration/deceleration means and coast means, for controlling the movement of said body so that said movement includes an acceleration mode, a first coast mode, second coast mode, and a deceleration mode;

wherein said constant acceleration/deceleration level is equal to a rational multiple of the pitch divided by the square of the sample time;

and wherein said control means comprises:

normalization means for expressing the distance to be moved as a normalized first digital number representing the distance in terms of integral pitches to be moved;

approximately means for generating a second digital number which is approximately one half the value of the first digital number;

storing means for storing a first set of distance values and a corresponding set of maximum velocity values which may be reached during a duration of sample times for an acceleration equal to said predetermined acceleration/deceleration level;

search means for finding in the storing means the largest distance value in the set of distance values which is less than or equal to the second digital number and the corresponding maximum velocity value of that largest distance value from the set of maximum velocity values;

first means for computing the number of sample times required for traveling the distance represented by the distance value;

second means for computing the difference between the first digital number and twice the distance value found in the storing means; and means for setting the duration of each of the acceleration and deceleration modes equal to the number of sample times computed by the first means and for setting the combined duration of the first and second coast modes such that the difference distance computed by the second means will be traveled in the first and second coast modes.

8. A method for moving a body by a total distance equal to an integral multiple of a predetermined pitch distance, comprising:

sampling the position of the body at periodic sample times;

calculating a distance that is equal to or less than half the total distance, where the distance is inversely proportional to an acceleration level equal to rational multiple of the pitch divided by the square of the sample time and the distance is proportional to the square of the maximum velocity of the body;

calculating the number of sample times required for accelerating the body at said acceleration level to reach the maximum velocity; and accelerating the body at said acceleration level over one or more periods of time whose total duration equals the number of sample times.

* * * * *

UNITED STATES PATENT AND TRADEMARK OFFICE
CERTIFICATE OF CORRECTION

PATENT NO. : 5,111,349

DATED : May 5, 1992

INVENTOR(S) : Ronald R. Moon

It is certified that error appears in the above-identified patent and that said Letters Patent is hereby corrected as shown below:

On title page, item [73] should read as follows:

-- Assignee: Alps Electric Co., Ltd.--
        Tokyo, Japan

Signed and Sealed this

Twelfth Day of April, 1994

*Attest:*

BRUCE LEHMAN

*Attesting Officer*

Commissioner of Patents and Trademarks